United States Patent
Geens et al.

(10) Patent No.: US 11,860,436 B2
(45) Date of Patent: Jan. 2, 2024

(54) CONNECTION MODULE FOR CABLE SEAL GEL BLOCK

(71) Applicant: COMMSCOPE CONNECTIVITY BELGIUM BVBA, Kessel-Lo (BE)

(72) Inventors: Johan Geens, Bunsbeek (BE); Bart Vos, Geel (BE)

(73) Assignee: CommScope Connectivity Belgium BVBA

( * ) Notice: Subject to any disclaimer, the term of this patent is extended or adjusted under 35 U.S.C. 154(b) by 0 days.

(21) Appl. No.: 17/682,532

(22) Filed: Feb. 28, 2022

(65) Prior Publication Data
US 2022/0334337 A1   Oct. 20, 2022

Related U.S. Application Data

(63) Continuation of application No. 16/608,624, filed as application No. PCT/EP2018/060336 on Apr. 23, 2018, now Pat. No. 11,262,520.
(Continued)

(51) Int. Cl.
G02B 6/42 (2006.01)
G02B 6/44 (2006.01)
G02B 6/38 (2006.01)

(52) U.S. Cl.
CPC ......... *G02B 6/4471* (2013.01); *G02B 6/3809* (2013.01); *G02B 6/3825* (2013.01);
(Continued)

(58) Field of Classification Search
CPC .. G02B 6/4471; G02B 6/4444; G02B 6/3809; G02B 6/3891
(Continued)

(56) References Cited

U.S. PATENT DOCUMENTS 5,042,901 A   8/1991 Merriken et al.
5,317,663 A   5/1994 Beard et al.
(Continued)

FOREIGN PATENT DOCUMENTS

WO   2013/117598 A2   8/2013
WO   2014/005916 A2   1/2014
(Continued)

OTHER PUBLICATIONS

International Search Report and Written Opinion of the International Searching Authority for International Patent Application No. PCT/EP2018/060336 dated Sep. 5, 2018, 14 pages.

*Primary Examiner* — Kaveh C Kianni
(74) *Attorney, Agent, or Firm* — Merchant & Gould P.C.

(57) ABSTRACT

Aspects and techniques of the present disclosure relate to an enclosure including a housing, a volume of sealant that defines a port in communication with an interior of the housing, and a fiber optic connection module including a sleeve that mounts within the port with the volume of sealant forming a seal about an exterior of the sleeve. The sleeve includes an inner end adjacent the interior of the housing and an outer end outside the housing. The fiber optic connection module also includes a demateable fiber optic connection interface adjacent the outer end of the sleeve. The demateable fiber optic connection interface includes a fiber optic connector. Other aspects of the present disclosure relate to fiber optic connection modules having features that make such modules suitable to be mounted within a port defined by a volume of sealant.

15 Claims, 18 Drawing Sheets

Related U.S. Application Data

(60) Provisional application No. 62/489,802, filed on Apr. 25, 2017.

(52) U.S. Cl.
CPC ......... *G02B 6/3874* (2013.01); *G02B 6/3891* (2013.01); *G02B 6/4444* (2013.01)

(58) Field of Classification Search
USPC ...................................................... 385/135
See application file for complete search history.

(56) References Cited

U.S. PATENT DOCUMENTS

| | | | |
|---|---|---|---|
| 5,323,480 A * | 6/1994 | Mullaney | G02B 6/4442 385/134 |
| 5,446,823 A * | 8/1995 | Bingham | G02B 6/4442 385/136 |
| 5,455,391 A * | 10/1995 | Demesmaeker | B25B 23/0064 174/92 |
| 6,579,014 B2 | 6/2003 | Melton et al. | |
| 6,648,520 B2 | 11/2003 | McDonald et al. | |
| 6,848,834 B1 * | 2/2005 | Roehrs | G02B 6/3894 385/59 |
| 7,090,407 B2 | 8/2006 | Melton et al. | |
| 7,137,742 B2 * | 11/2006 | Theuerkorn | G02B 6/3831 385/53 |
| 7,207,727 B2 * | 4/2007 | Tran | G02B 6/389 385/83 |
| 7,572,065 B2 | 8/2009 | Lu et al. | |
| 7,686,519 B2 | 3/2010 | Lu | |
| 7,744,286 B2 | 6/2010 | Lu et al. | |
| 7,780,173 B2 * | 8/2010 | Mullaney | F16L 5/08 277/621 |
| 8,989,550 B2 * | 3/2015 | Allen | G02B 6/4454 385/135 |
| RE45,951 E * | 3/2016 | Mullaney | G02B 6/4471 |
| 9,291,790 B2 * | 3/2016 | Kimbrell | G02B 6/4471 |
| 9,304,262 B2 * | 4/2016 | Lu | G02B 6/4403 |
| 9,310,578 B2 * | 4/2016 | Vastmans | H04Q 1/025 |
| 9,348,096 B2 * | 5/2016 | Kmit | G02B 6/4285 |
| 9,513,451 B2 * | 12/2016 | Corbille | G02B 6/4494 |
| 10,473,873 B2 | 11/2019 | Diepstraten et al. | |
| 10,605,998 B2 * | 3/2020 | Rosson | G02B 6/3873 |
| 10,976,513 B2 * | 4/2021 | Allen | G02B 6/443 |
| 2008/0232743 A1 * | 9/2008 | Gronvall | G02B 6/3897 385/77 |
| 2012/0008909 A1 * | 1/2012 | Mertesdorf | G02B 6/4442 385/135 |
| 2014/0226935 A1 * | 8/2014 | Allen | G02B 6/4444 385/59 |
| 2016/0041356 A1 * | 2/2016 | Wang | G02B 6/3825 385/56 |
| 2016/0124173 A1 | 5/2016 | Kowalczyk et al. | |
| 2016/0154184 A1 * | 6/2016 | Bund | G02B 6/3821 29/428 |
| 2016/0202441 A1 * | 7/2016 | Claessens | G02B 6/4477 385/113 |
| 2016/0204592 A1 * | 7/2016 | Coenegracht | F16J 15/104 277/606 |

FOREIGN PATENT DOCUMENTS

| | | |
|---|---|---|
| WO | 2014/167447 A1 | 10/2014 |
| WO | 2014/197894 A1 | 12/2014 |
| WO | 2016/043922 A2 | 3/2016 |
| WO | 2017/118749 A2 | 7/2017 |
| WO | 2018/020022 A1 | 2/2018 |

* cited by examiner

CONNECTION MODULE FOR CABLE SEAL GEL BLOCK

CROSS-REFERENCE TO RELATED APPLICATION

This application is a Continuation of U.S. patent application Ser. No. 16/608,624, filed on Oct. 25, 2019, now U.S. Pat. No. 11,262,520, which is a National Stage Application of PCT/EP2018/060336, filed on Apr. 23, 2018, which claims the benefit of U.S. Patent Application Ser. No. 62/489,802, filed on Apr. 25, 2017, the disclosures of which are incorporated herein by reference in their entireties. To the extent appropriate, a claim of priority is made to each of the above disclosed applications.

TECHNICAL FIELD

The present disclosure relates generally to optical fiber enclosures and related equipment. More particularly, the present disclosure relates to enclosures and to modules that can be used with the enclosures to provide additional connectivity options.

BACKGROUND

Fiber optic communication systems are becoming prevalent in part because service providers want to deliver high band width communication capabilities to customers. Fiber optic communication systems often employ a network of fiber optic cables capable of transmitting large volumes of data and voice signals over relatively long distances. A typical fiber optic network includes a system of trunk fiber optic cables each including a relatively large number of optical fibers. Optical fiber networks also include drop cables that interconnect to fibers of the trunk cables at various locations along the lengths of the trunk cables. The drop cables can be routed from the trunk cables to subscriber locations or to intermediate structures such as drop terminals.

Drop cables are often connected to the optical fibers of trunk cables via splices (e.g., fusion splices or mechanical splices). Splices are often supported within splice trays that are protected from the environment by sealed, re-enterable enclosures. Such enclosures typically include sealed ports through which the trunk cables and drop cables enter the enclosures. One example type of enclosure includes a dome and a base that are interconnected by a clamp. A gel block mounts within the base. The gel block defines a plurality of cable ports for allowing cables to be routed into the enclosure through the base. The cable ports are sealed by pressurizing the gel block with a manual actuator. Plugs are mounted within any of the cable ports that are unused. Example dome-style splice closures are disclosed in U.S. Pat. Nos. 7,780,173; 5,446,823; and 5,323,480.

Improvements are needed in the area of providing enhanced connectivity options.

SUMMARY

Aspects of the present disclosure relate to fiber optic connection modules that can be mounted within a port of a volume of sealant of an enclosure to provide the enclosure with enhanced connectivity options. In certain examples, the fiber optic connection module includes a passive fiber optic power splitter module (e.g., including a symmetric or asymmetric optical power splitter), an indexing module, a fan-out module, a wavelength division multi-plexing module and/or a module that provides compatibility with hardened (i.e., ruggedized) connectivity. In certain examples, the fiber optic connection modules provide compatibility with hardened connectivity so as to be capable of interconnecting with cables terminated with hardened fiber optic connectors which may be single fiber or multi-fiber connectors and may also be ferruled or ferrule-less connectors.

Aspects and techniques of the present disclosure also relate to an enclosure including a housing, a volume of sealant that defines a port in communication with an interior of the housing, and a fiber optic connection module including a sleeve that mounts within the port with the volume of sealant forming a seal about an exterior of the sleeve. The sleeve includes an inner end adjacent the interior of the housing and an outer end outside the housing. The connection module also includes a demateable fiber optic connection interface adjacent the outer end of the sleeve. The demateable fiber optic connection interface includes a fiber optic connector. Other aspects of the present disclosure relate to fiber optic connection modules having features that make such module suitable to be mounted within a port defined by a volume of sealant.

The present disclosure further relates to fiber optic connection modules that include connection interfaces and components that can be inserted into or removed from a sealant arrangement, such as a gel block, within an enclosure. In certain examples the sealing arrangement includes ports for sealing cables that enter the enclosure and ports that receive the fiber connection modules. In certain examples, one type of port can accommodate a cable or a fiber optic connection module depending upon installation demands. In certain examples, the sealant arrangement is maintained under pressure in use by one or more springs.

In certain examples, fiber optic connection modules in accordance with the principles of the present disclosure include a first port for receiving a non-hardened fiber optic connector from inside the enclosure and a second port for receiving a hardened fiber optic connector from outside the enclosure. In one example, the second port faces outwardly from a sleeve sealed within a gel block and the first port faces into the sleeve. In another example, the ports can be provided at the end of a fiber optic tether including one or more optical fibers (e.g., pigtail).

One aspect of the present disclosure relates an enclosure including a housing and a sealant assembly that defines a cable port for routing a cable into the housing. The enclosure can include a connector module configured to be mounted within the cable port of the sealant assembly such that the volume of sealant seals about a main body of the connector module. The main body has a first end and an opposite second end and defines a passage that extends from the first end to the second end. The connector module can further include an optical adapter arrangement that can be loaded into the main body of the connector module through the second end of the main body.

A further aspect of the disclosure relates to system that can include a housing with a dome having an open end and a base that is secured to the open end of the dome and a sealant assembly that includes a volume of sealant that mounts within the base and defines a plurality of cable through-ports that pass through the sealant assembly. The system can further include a connector module having a sleeve including a first end and an opposite second end. The sleeve can be mounted within one of the plurality of cable through-ports of the sealant assembly such that the volume of sealant seals about the sleeve. The first end of the sleeve can be positioned outside the housing and the second end of the sleeve can be positioned inside the housing. The sleeve can define a passage that extends from the first end to the second end. An optical adapter arrangement can be mounted at the first end of the sleeve to provide an adapter port accessible from outside the housing.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
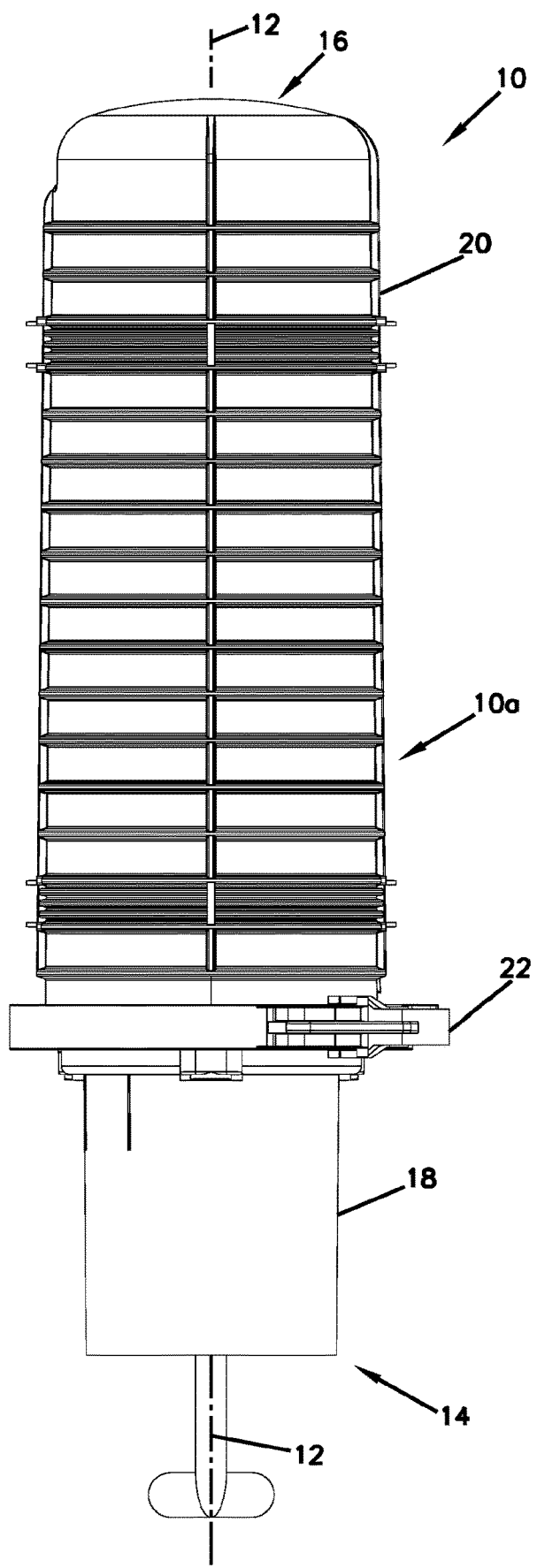
FIG. 1 is a side view of an enclosure in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the inventive aspect disclosed herein.

The present disclosure relates to a system including an enclosure including a sealant arrangement defining one or more ports for routing structures into an interior of the enclosure. Often, a cable or cables may be routed through the ports defined by the sealant with the sealant providing seals about the cables. A strain relief structure such as a fixture can be provided in the enclosure for anchoring strength members (e.g., string-like strength members such as aramid yarn or more rigid strength members such a rods having a construction that includes glass reinforced polymer) of the cables relative to the enclosure. The system also includes fiber optic connection modules that also can be sealed within the ports. In certain examples, the modules can be sized to fit within the cable ports in which case the cable ports could accommodate cables or modules depending upon the given installation. In other examples, dedicated module ports can be provided to accommodate the modules and differently sized cable ports can be provided for accommodating cables. In certain examples, the fiber optic connection modules can include a passive fiber optic power splitter module (e.g., including a symmetric or asymmetric optical power splitter), an indexing module, a fan-out module, a wavelength division multi-plexing module and/or a module that provides compatibility with hardened (i.e., ruggedized) connectivity. In certain examples, the fiber optic connection modules provide compatibility with hardened connectivity so as to be capable of interconnecting with cables terminated with hardened fiber optic connectors which may be single fiber or multi-fiber connectors and may also be ferruled or ferrule-less connectors. In certain examples, the fiber optic connection modules include sleeves (e.g., tubes) that are sealed within the sealant ports. In certain examples, hardened connector ports are provided at outside ends of the sleeves. In certain examples connectorized tethers are routed from the sleeves. In certain examples, the sleeves are configured to be anchored relative to the enclosure. For example, the sleeves can be anchored (e.g., by fasteners, a snap-fit arrangement, a mechanical interlock that may or may not be a snap-fit arrangement, clamps, etc.) relative to the enclosure. The anchoring structures may affix directly to the enclosure or to an intermediate structure that is fixed relative the enclosure.

Figure 2:
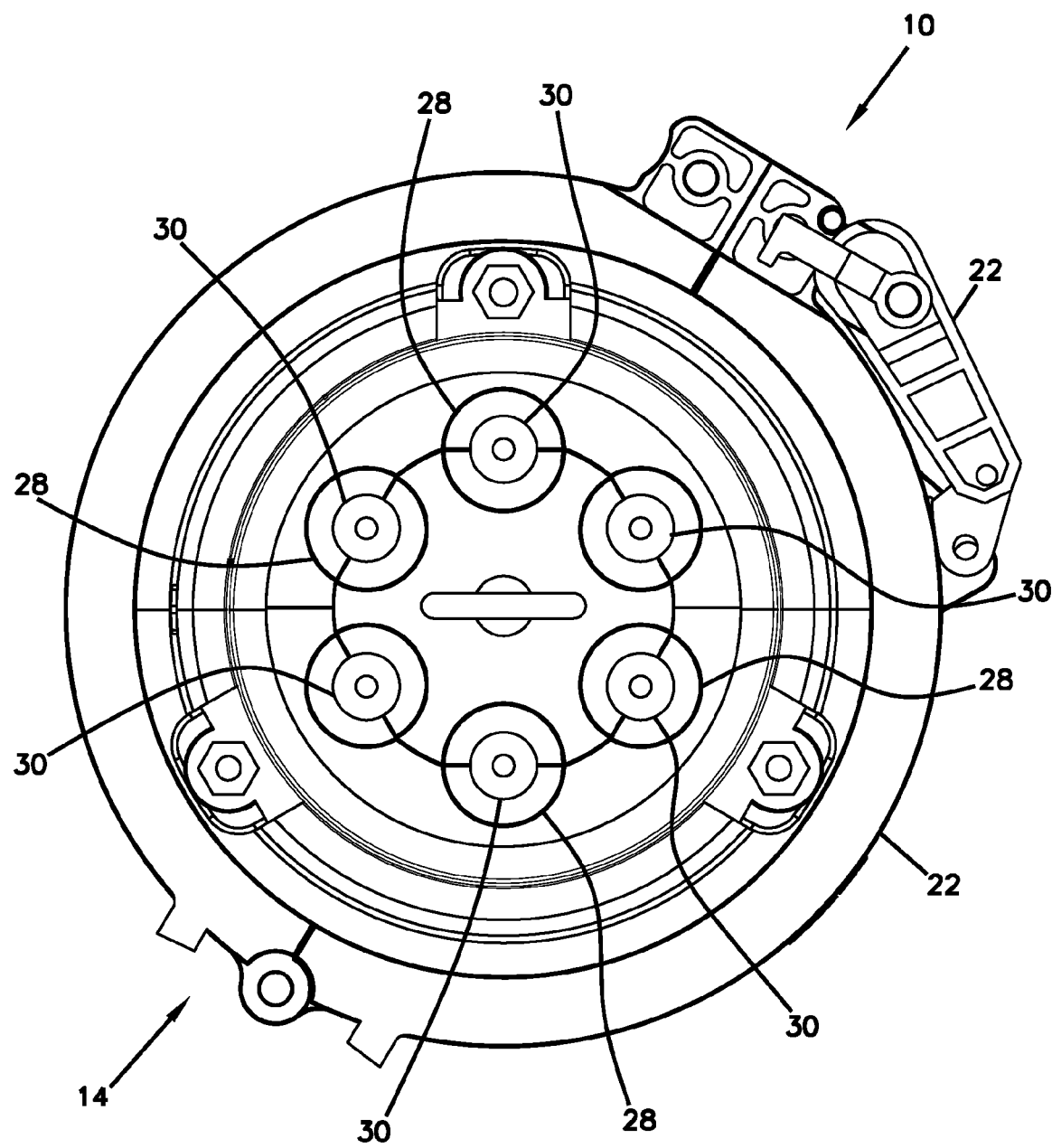
FIG. 2 is a bottom view of the enclosure of FIG. 1.
Figure 3:
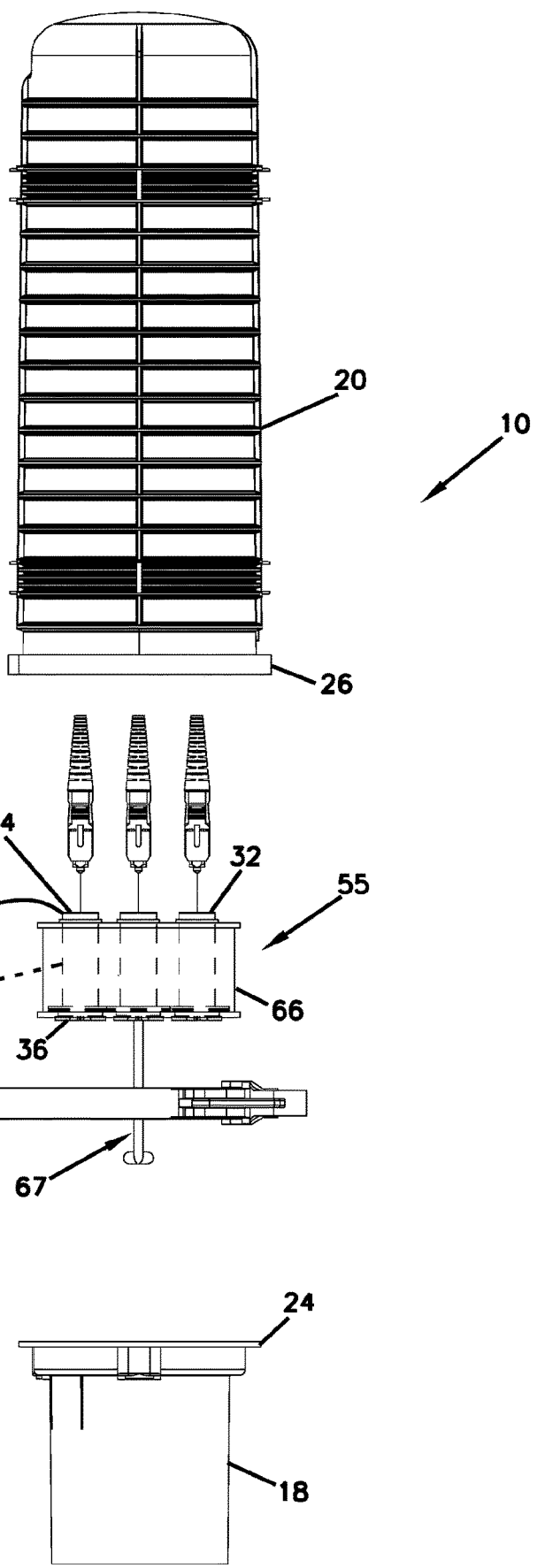
FIG. 3 is an exploded view of the enclosure of FIG. 1 showing a sealant arrangement in accordance with the principles of the present disclosure with fiber optic connection modules in accordance with the principles of the present disclosure secured within ports of the sealant arrangement.

FIGS. 1-3 show an enclosure 10 in accordance with the principles of the present disclosure. The enclosure 10 defines a central longitudinal axis 12 that extends along a length of the enclosure 10 from a bottom end 14 to a top end 16. A base 18 defines the bottom end 14 of the enclosure 10 while a dome 20 defines the top end 16 of the enclosure 10 that together form a housing 10a. The base 18 and the dome 20 are interconnected by a clamp 22 (e.g., a channel-style clamp) that mounts over flanges 24, 26 respectively defined by the base 18 and the dome 20 (see FIG. 3). A seal (not shown) can mount between the flanges 24, 26 to provide an environmental seal that prevents moisture, dust and, pests from entering the interior of the enclosure 10. Other enclosure configurations (e.g., enclosures with mating half-shells, enclosures with pivoting access doors, enclosures with main bodies and side covers, butt-style enclosures, pass-through enclosures, etc.) are also contemplated and are within the scope of the present disclosure.

A plurality of cable through-ports 28 (e.g., cable ports) extend through and are defined by a sealant arrangement 54 that mounts within the base 18. The ports 28 allow cables (e.g., trunk cables, drop cables, or other cables) to enter the enclosure 10 in a sealed manner. The plurality of cable through-ports 28 can be temporarily blocked by plugs 30 to seal any unoccupied cable through-ports 28 (see FIG. 2). When it is desired to install a cable (e.g., a drop cable or a pass-through cable) through one of the cable through-ports 28, the plug 30 corresponding to the given cable through-port 28 is removed so that the cable can be inserted through the cable through-port 28.

Figure 6:
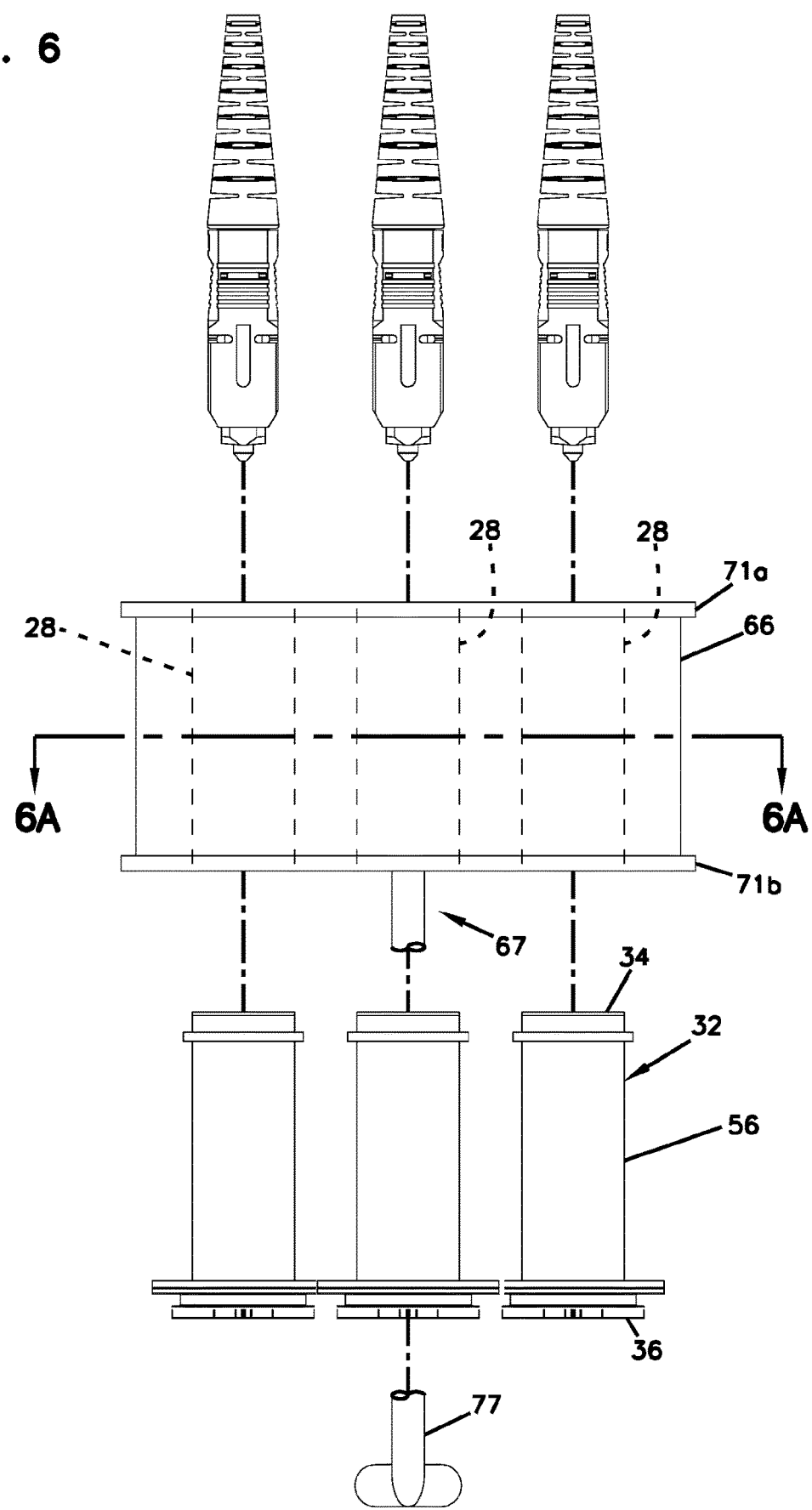
FIG. 6 shows the sealant arrangement of FIG. 3 showing fiber optic connection modules in accordance with the principles of the present disclosure exploded from the sealant arrangement.
Figure 6A:
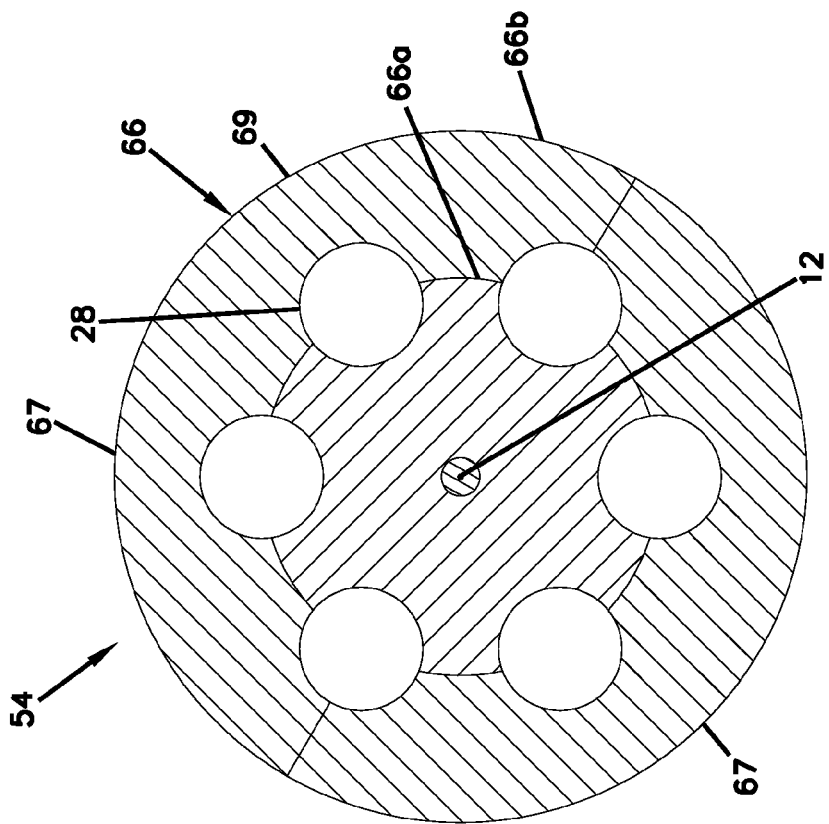
FIG. 6A is a cross-sectional view taken along section line 6A-6A of FIG. 6.

As best shown at FIG. 6A, the sealant arrangement 54 includes a volume of sealant 66 (e.g., a gel block) that defines the ports 28 and also forms a perimeter seal with an interior of the base 18. The volume of sealant includes an inner portion 66a and an outer portion 66b. The outer portion 66b is positioned outward in a radial orientation (i.e., radial relative to the axis 12 when the sealing unit is mounted in the base 18) relative to the inner portion 66a. The ports 28 are defined between the inner and outer portions 66a, 66b (e.g., half-ports are defined by the inner portion 66a and corresponding half-ports are defined by the outer portion 66b). The outer portions 66b cooperate to form the perimeter seal with respect to the interior of the base 18 (e.g., the outer portions 66b include an outer surface 69 adapted to engage and seal against an inner surface of the base 18 when the sealant arrangement is mounted in the base). The outer portion 66b includes a plurality of segments 67 that can be removed from the inner portion 66a when the volume of sealant 66 has been removed from the base 18. By removing the segments of the outer portion 66b from the inner portion 66a, cables or other structures (e.g., fiber optic connection modules) can be laterally inserted within the ports 28. After the structures have been inserted in the half-ports of the inner portion 66a, the segments of the outer portion 66b can be assembled about the inner portion 66a such that the structures are captured within the ports 28 between the inner and outer portions 66a, 66b. Thus, the sealant arrangement 54 can have a wrap-around configuration such that structures such as cables or modules need not be axially inserted through the ports 28. Other sealant arrangements are also contemplated. For example, another suitable sealant arrangement is disclosed by PCT International Publication No. WO 2014/0059216, which is hereby incorporated by reference in its entirety.

The sealant arrangement 54 can be part of a sealing unit 55 that mounts within the base 18. The sealing unit can include an actuation arrangement 67 for pressurizing the volume of sealant 66 within the base 18 causing the sealant to flow/deform within the base to fill any voids such that peripheral/perimeter sealing is provided with the base 18 and sealing is also provided about any cables or other structures routed through any of the ports 28. In one example, axial pressurization (e.g., pressurization along the axis 12 when the sealing unit is mounted in the base 18) of the volume of sealant 66 forces the volume of sealant 66 to deform radially outwardly to provide a circumferential seal against an interior surface of the base 18. Concurrently, pressurization of the volume of sealant 66 causes the cable through-ports 28 to constrict in diameter. In this way, the volume of sealant 66 presses against and conforms to the outer shape of whatever structure is mounted through the primary cable through-ports 28 (e.g., a primary cable, a drop cable, a pass-through cable, a distribution cable, a plug 30, or a connector module 32). That is, the volume of sealant 66 forms circumferential seals around the structures received within the cable through-ports 28.

Figure 8:
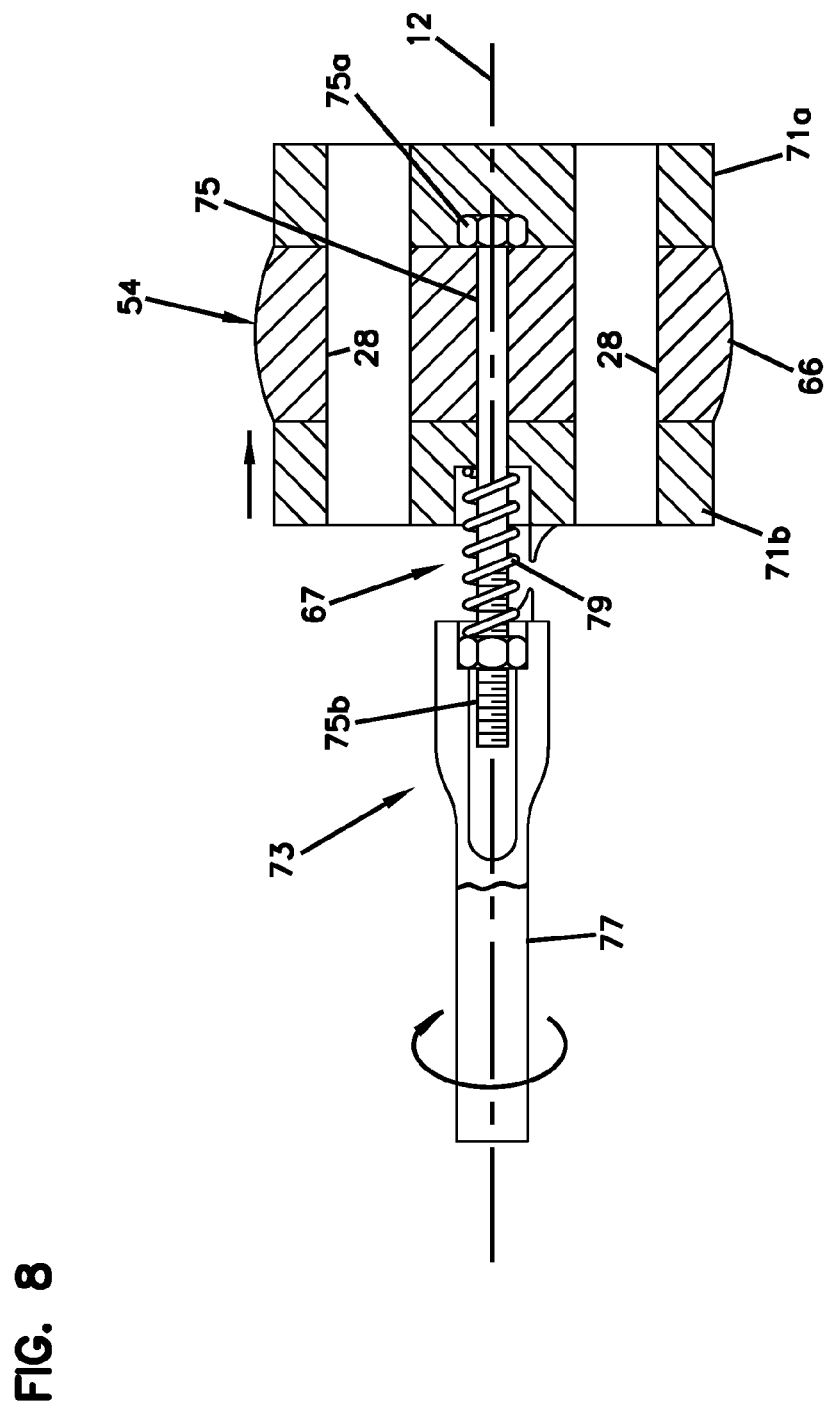
FIG. 8 shows an example actuation arrangement for pressurizing the sealant of the sealant arrangement.

As shown at FIG. 8, the actuation arrangement 67 can include inner and outer sealant containment structures 71a, 71b (i.e., pressurization structures) such as plates, walls, retainers or like structures between which the volume of sealant is axially positioned and contained. The outer sealant containment structure 71b is positioned outward in an axial orientation (i.e., along axis 12 when the sealing unit is mounted in the base 18) relative to the inner sealant containment structure 71a. The containment structures 71a, 71b can define openings that coincide with the locations of the ports 28 and can include interconnected inner portions and outer portions that correspond to the inner and outer portions 66a, 66b of the volume of sealant 66. The inner and outer portions of the containment structures 71a, 71b can interlock and can also be separated from each other such that the containment structures 71a, 71b do not interfere with the ability to insert structures laterally into the ports 28 (i.e., the containment structures can be configured to complement the wrap-around functionality of the sealant assembly).

The actuation arrangement 67 can also include an actuator that can be actuated to force the sealant containment structures 71a, 71b axially together to cause the volume of sealant to be pressurized between the sealant containment structures 71a, 71b. The actuator can cause an axial spacing between the sealant containment structures 71a, 71b to reduce in size when the actuator is actuated. In some examples, the actuator can include a threaded configuration that is actuated through a threading action (e.g., threading an actuator handle). In other examples, the actuator can include a cam configuration that is actuated through a cam action and may include an actuator handle in the form of a pivoting lever arm. In certain examples, the actuation arrangement 67 can include one, two, three or more springs for applying a spring load or loads (e.g., spring pressure) that biases the sealant containment structures 71a, 71b axially together when the actuator is actuated to cause the volume of sealant to be pressurized under spring pressure. In some examples, a shaft or shafts placed under spring tension can be used to transfer spring pressure between the sealant containment structures 71a, 71b.

Referring again to FIG. 8, the actuation arrangement 67 is shown including an example actuator 73 including a tensioning shaft 75, a rotatable handle 77 threaded on the shaft 75 and a spring 79 positioned over the shaft 75 and captured axially between the handle 77 and an outer side of the outer sealant containment structure 71b. The shaft 75 includes an inner end 75a that is attached to the inner containment structure 71a and an attachment location. In one example, the attachment location includes a mechanical interface that prevents relative axial movement between the shaft 75 and the inner containment structure 71a and also prevents the shaft 75 from rotating about its axis relative to the inner containment structure 71a. An outer end 75b of the shaft 75 is threaded and threadingly engages the handle 77. The actuation arrangement 67 is actuated by threading the handle 77 on the shaft 75 such that the spring 79 is compressed against the outer surface of the outer sealant containment structure 71b causing the shaft 75 to be tensioned such that the inner and outer sealant containment structure 71a, 71b are drawn together to pressurize the sealant between the containment structures 71a, 71b. The spring pressure provided by the compressed spring 79 maintains the volume of sealant 66 under pressure within the base 18.

In accordance with the principles of the present disclosure, fiber optic connection modules can be used in combination with the enclosure to provide more variety regarding the connectivity options and functionality of the enclosure. For example, FIG. 3 shows a plurality of fiber optic connection modules 32 installed within the cable through-ports 28 of the enclosure. In this embodiment, the fiber optic connection modules 32 each provide a non-ruggedized connection interface 34 at one end (e.g., an inner end) and a ruggedized connection interface 36 at the opposite end (e.g., an outer end) (see FIGS. 2, 6 and 7).

As used herein, the term "fiber optic connector" includes male fiber optic connectors, female fiber optic connectors and hermaphroditic fiber optic connectors. In some examples, male fiber optic connectors can have a form factor that includes a plug. In some examples, female fiber optic connectors can have a form factor that includes a port. In some examples, male fiber optic connectors can include connectors such as SC plugs or LC plugs. In some examples, female fiber optic connectors can include fiber optic adapters such as SC adapters or LC adapters. In some examples, the fiber optic connectors can be hardened. Examples of hardened female fiber optic connectors such as enclosure mounted hardened fiber optic adapters are disclosed by U.S. Pat. Nos. 7,207,727; 6,579,014; and 7,744,286, the disclosures of which are hereby incorporated by reference in their entireties. Examples of cable mounted hardened female fiber optic connectors are disclosed by U.S. Pat. No. 7,686,519 and U.S. patent application Ser. No. 14/782,934, the disclosures of which are hereby incorporated by reference in their entireties. Examples of hardened multi-fiber fiber optic connectors are disclosed by U.S. Pat. Nos. 9,304,262 and 7,137,742, and U.S. patent application Ser. No. 14/896,394, the disclosures of which are hereby incorporated by reference in their entireties. Examples of hardened male fiber optic connectors are disclosed by U.S. Pat. Nos. 7,744,386; 7,090,407; and 6,648,520; the disclosures of which are hereby incorporated by reference in their entireties. The above-identified fiber optic connection systems are ferruled fiber optic connections systems where the ends of optical fibers are secured in ferrules and ferrules assist in alignment of the optical fibers. Fiber optic connection systems in accordance with the principles of the present disclosure also include ferrule-less fiber optic connection systems where the optical fibers being aligned are not supported by ferrules. Examples of ferrule-less fiber optic connection systems are disclosed by PCT International Publication Nos. WO2016/043922 and WO2013/117598 and U.S. Patent Application Ser. No. 62/454,439, the disclosures of which are hereby incorporated by reference in their entireties. Fiber optic connectors are examples of de-mateable fiber optic connection interfaces.

A fiber optic connection system is hardened if it is more robust than convention indoor connection systems such as standard LC or SC indoor connection systems. An example indoor SC connection system is disclosed by U.S. Pat. No. 5,317,663, which is hereby incorporated by reference in its entirety. Hardened male and/or female fiber optic connectors in accordance with the principles of the present disclosure can be adapted for outdoor environmental use and can include environmental seals (e.g., elastomeric seals which may include ring—like seals such as o-ring seals) for preventing moisture/water intrusion. In certain examples, a hardened connection system can include a robust connector fastening arrangement. In certain examples, the robust connector fastening arrangement can include a twist-to-lock interface for holding two hardened fiber optic connectors together. Example twist-to-lock interfaces can include threaded interfaces and bayonet-style interfaces.

Figure 4:
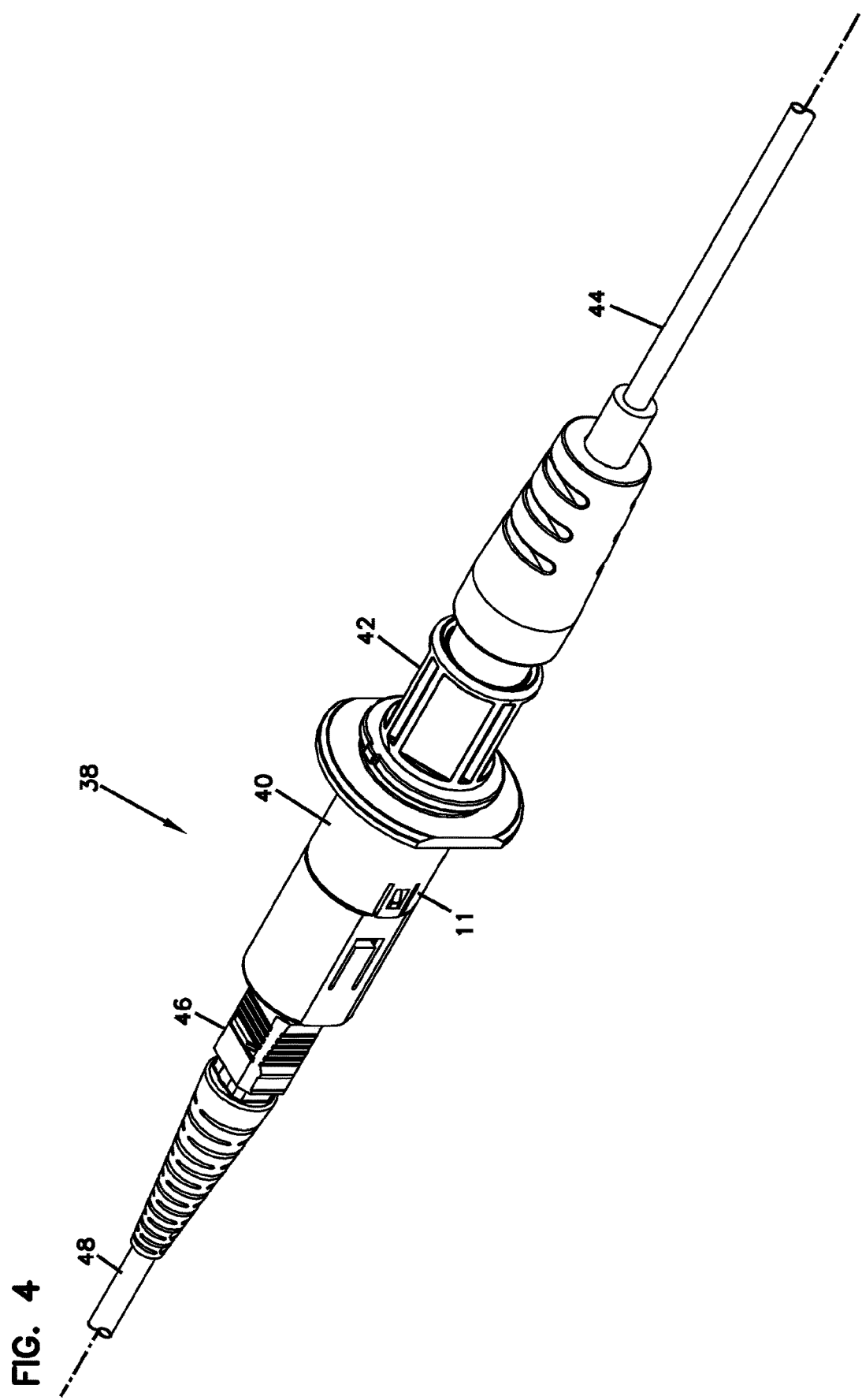
FIG. 4 is a perspective view of an example fiber optic connection system connecting an optical fiber terminated at an SC connector with a fiber optic cable terminated at a hardened fiber optic connector via a hardened fiber optic adapter, wherein the SC connector is connected at an unhardened port of the hardened fiber optic adapter and the hardened fiber optic connector is connected at a hardened port of the hardened fiber optic adapter.
Figure 5:
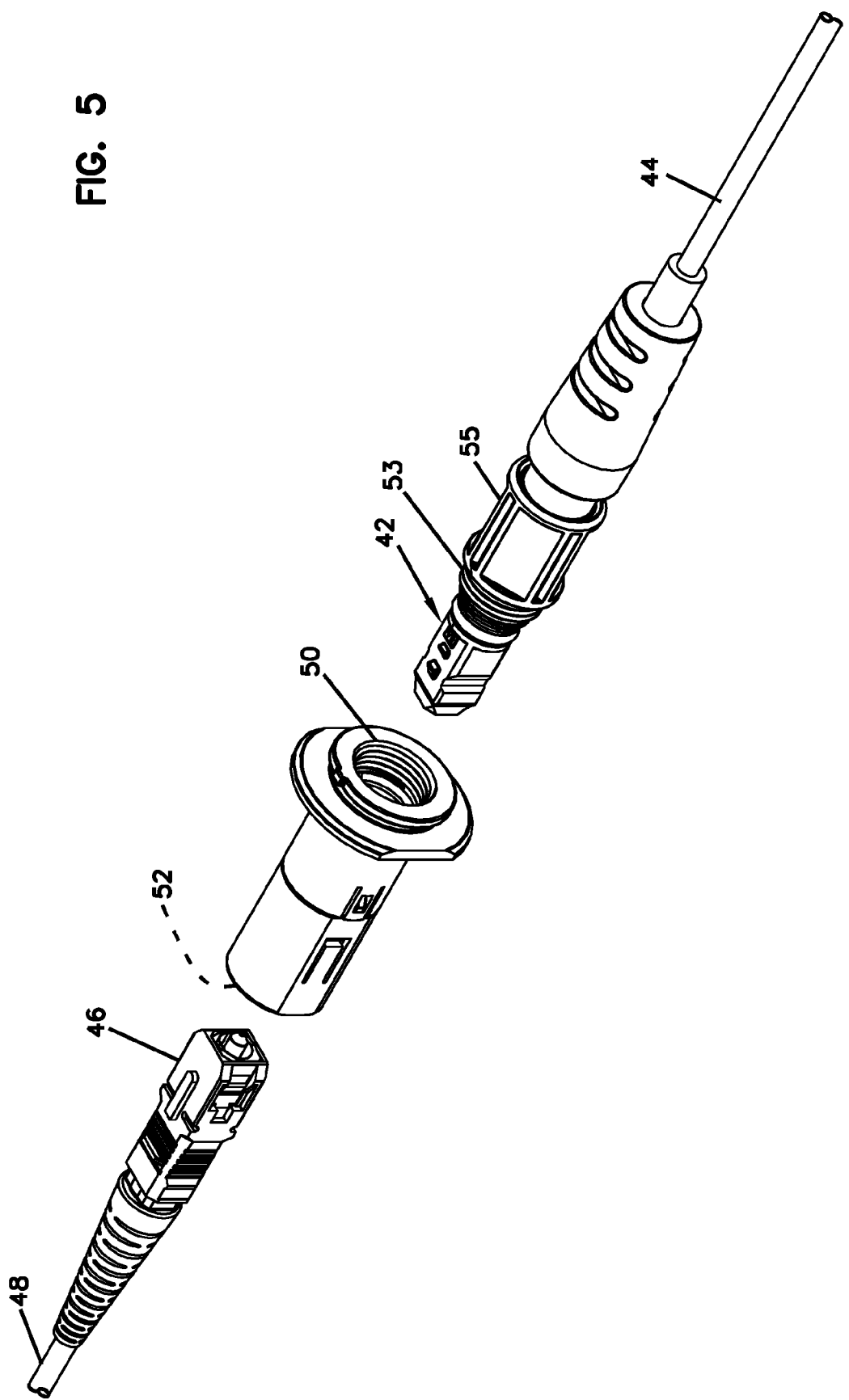
FIG. 5 is a perspective view of the fiber optic connection system of FIG. 4 with the SC connector disconnected from the hardened fiber optic adapter and the hardened fiber optic connector also disconnected from the hardened fiber optic adapter.

FIGS. 4 and 5 depict an example fiber optic connection system 38 usable to form a component of the connector module 32. The fiber optic connection system 38 can include a fiber optic adapter 40 (e.g., a female fiber optic connector or coupler), a first fiber optic connector 42 (e.g., a male fiber optic connector) terminating a first fiber optic cable 44, and a second fiber optic connector 46 (e.g., a male fiber optic connector) terminating a second fiber optic cable 48.

The fiber optic adapter 40 includes a hardened first port 50 for receiving the first fiber optic connector 42 and an unhardened second port 52 for receiving the second fiber optic connector 46. One example of an adapter is illustrated and described at U.S. patent application Ser. No. 11/657,402 entitled HARDENED FIBER OPTIC CONNECTOR, filed Jan. 24, 2007, that is hereby incorporated by reference in its entirety. The first fiber optic cable 44 is optically coupled to the second fiber optic cable 48 when the first and second fiber optic connectors 42, 46 are positioned within their respective ports 50, 52 of the fiber optic adapter 40. The second fiber optic connector 46 can be a conventional non-hardened fiber optic connector such as an SC connector. One example of an SC connector is illustrated and described at U.S. Pat. No. 5,317,663, which is hereby incorporated by reference in its entirety.

Figure 7:
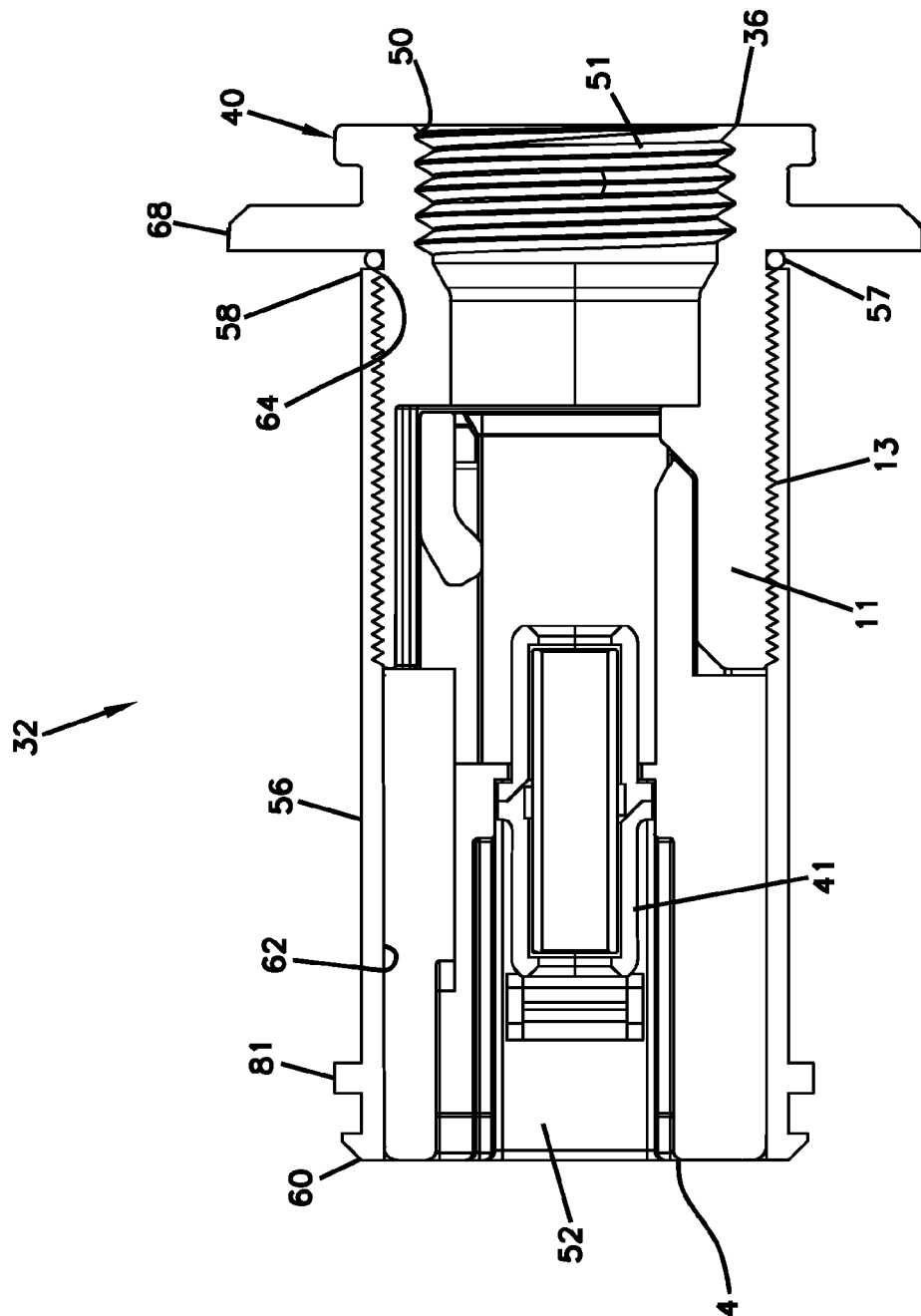
FIG. 7 is a schematic cross-sectional view taken generally along line 7-7 of one of the fiber optic connection modules of FIG. 6 showing an optical adapter arrangement positioned therein in accordance with the principles of the present disclosure.

Referring to FIGS. 6 and 7, the connector modules 32 can each have a cylindrical main body 56, although alternatives are possible, that may form a cylindrical sleeve or insert that is arranged and configured to be sealed within respective cable through-ports 28 of the sealant assembly 54. The main body 56 of the connector modules 32 can each have a through-passage 62 that extends between a first end 58 and an opposite second end 60. The first end 58 can define a front opening 64 into the passage 62. The fiber optic adapter 40 can be inserted through the front opening 64 such that an adapter body 11 (see FIG. 4) of the fiber optic adapter 40 is positioned within the passage 62 of the main body 56 of the connector module 32.

In one example, the fiber optic adapter 40 can be secured within the passage 62 of the connector module 32 by a mechanical interface such as a snap-fit connection, a threaded connection or other connection. In other examples, the adapter 40 can be secured within the main body 56 by adhesive or by one or more separate fasteners. As depicted, the body 11 has external threads 13 that are threaded into corresponding internal threads defined within the passage 62 of the main body 56 to secure the adapter 40 within the main body 56. The adapter 40 includes an internal ferrule alignment sleeve 41 for receiving and aligning ferrules corresponding to the first and second fiber optic connectors 42, 46 when the first and second fiber optic connectors 42, 46 are secured within the adapter 40. The first port 50 includes internal threads 51 for mating with corresponding threads 53 of a rotatable coupler 55 (e.g., a nut) of the first fiber optic connector 42 to secure the first fiber optic connector 42 within the port 50. In other examples, other twist-to-lock interfaces (e.g., a bayonet style interface) could be used. The second port 52 includes latching arms for securing the second fiber optic connector 46 within the second port 52. A sealing member may be provided to environmentally seal the fiber optic adapter 40 relative to the main body 56. Example seals can include radial seals and/or axial face seals. Referring to FIG. 7, an axial seal 57 is shown compressed between an outer flange 68 of the adapter body 11 and the first end 58 of the main body 56. When a fiber optic connector is not secured within the first port 50, the first port 50 can be closed and sealed by a removable plug/cap. The removable plug/cap can be secured at the first port 50 by a twist-to-lock interface such as a threaded interface or a bayonet-style interface.

When the connector modules 32 are mounted within the cable through-ports 28 of the sealant assembly 54, the volume of sealant 66 presses against and conforms to the outer shapes of the connector modules 32 to form circumferential seals around exterior surfaces of the main bodies 56. When the connector modules 32 are mounted within respective cable through-ports 28, the first fiber optic cable 44 is an external cable (e.g., a drop cable located outside the enclosure 10) and the second fiber optic cable 48 can include an up-jacketed optical located inside the enclosure 10. The optical fiber of the second optical cable 48 can be optically coupled to an optical fiber of a distribution cable (e.g., a cable optically coupled a central location such as a central office) routed into the enclosure and accessed within the enclosure. In such an example, the enclosure functions a connection location for optically coupling optical fibers of the distribution cable to drop cables. With one of the connector modules 32 sealed within one of the cable through-ports, the connector module 32 can provide an optical connection between the external fiber optic cable 44 (i.e., the cable outside the enclosure) and the internal optical cable 48 (i.e., the cable inside the enclosure). To provide the optical connection between the internal and external cables, the second fiber optic connector 46 is secured within the second port 52 and the first fiber optic connector 42 is secured within the first port 50.

In one example, the connector modules 32 can include an anchoring structure or structures for axially retaining (e.g., anchoring, fixing, locking) the connector modules 32 within the ports 28 during use. For example, the connector modules can include flanges, tabs, fingers, snap-fit structures, latches, fasteners or other structures adapted to provide an anchoring function relative to the enclosure 10. The anchoring structures can engage the inner containment structure 71a, and/or the outer containment structure 71b, and or the housing 10a, and/or the base 18, and/or the dome 20, and/or an intermediate mounting/attachment structure (e.g., a frame structure) mounted within the housing. As depicted, the connector modules 32 include inner flanges 81 and outer flanges 68 that cooperate to capture the and axially secure the modules 32 within the sealing unit. In one example, the flanges can both be integrated within the main body 56. As depicted, the flange 81 is integrated within the main body 56 and the flange 68 is integrated with the body 11 of the adapter 40. In another example, the flange 68 can be integrated with the main body 56. When one of the connector modules 32 is mounted within the sealing unit, the inner flange 81 opposes an inner surface of the inner containment structure 71a and the outer flange 68 opposes an outer surface of the containment structure 71b. In other examples, at least one of the flanges or other anchoring structure can interlock with at least one of the containment structures.

Figure 7A:
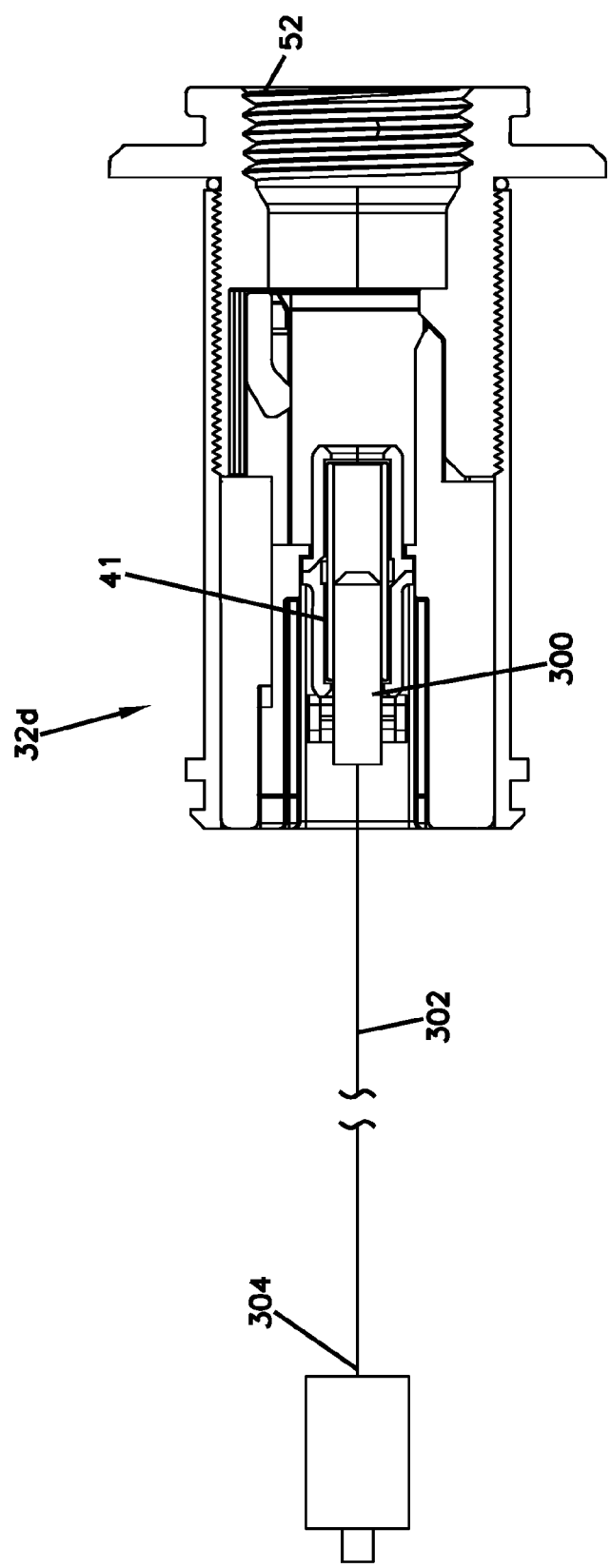
FIG. 7A shows an alternative fiber optic connection module having a lower cost configuration that does not require a full non-ruggedized internal fiber optic connector within the fiber optic connection module.

FIG. 7A shows another connector module 32d in accordance with the principles of the present disclosure. The connector module 32d has the same construction as the connector modules 32, except a lower cost connection arrangement has been used within the second port 52. For example, rather than using a full connector (e.g., connector 46) at the second port, a reduced cost connector/connection arrangement is used. As depicted, the reduced cost connection arrangement includes a ferrule 300 secured (e.g., adhesively secured or mechanically secured) within the ferrule alignment sleeve 41. In one example, the ferrule 300 is fixed axially within the sleeve 41. In one example, the reduced cost connection arrangement may not include a spring for biasing the ferrule and for allowing axial movement of the ferrule and does not include a typical outer connector body for housing a spring and supporting the ferrule. The ferrule 300 can be mounted at the end of an optical fiber 302 that is routed through the sleeve of the connector module 32d and into the enclosure. Within the enclosure, the optical fiber 302 can have an end 304 that is connectorized, or that can be spliced or otherwise optically coupled to another optical fiber within the enclosure.

Figure 7B:
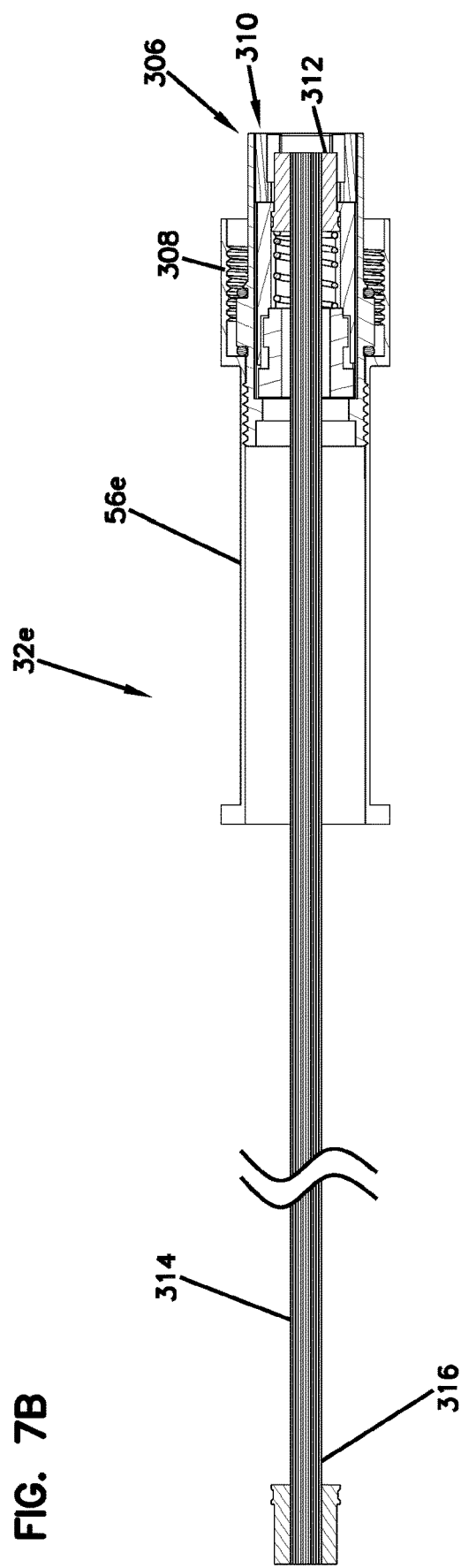
FIG. 7B shows an alternative fiber optic connection module having a multi-fiber connection interface.

FIG. 7B shows another connector module 32e in accordance with the principles of the present disclosure. Similar to the connector module 32, described previously, the connector module 32e can be inserted within a cable through-port 28 of the sealant assembly 54 to be sealed with a gel type seal. The connector module 32e can include a main body 56e having a sleeve-like configuration with an outer surface adapted to be sealed within one of the ports 28. The main body 56e can have anchoring structures of the type described above for anchoring the connector module 32e relative to the enclosure 10. A multi-fiber demateable fiber optic connection interface 306 is provided at an outer end of the main body 56e. In one example, the multi-fiber demateable fiber optic connection interface 306 is hardened and is adapted for being sealed when a hardened fiber optic connector is mated therewith (e.g., a seal can be mounted at the interface or on the hardened fiber optic connector). In one example, the multi-fiber demateable fiber optic connection interface 306 includes a twist-to-lock interface 308 (e.g., a threaded interface) for securing the hardened connector thereto when an optical connection has been made. The multi-fiber demateable fiber optic connection interface 306 can include a hardened port 310 containing a multi-fiber ferrule 312 in which a plurality of optical fibers 314 are terminated. The optical fibers 314 can be ribbonized and when the module is mounted in one of the sealed ports of the enclosure, the optical fibers 314 can extend from the main body 56e into the interior of the enclosure. Interior ends 316 of the optical fibers 314 can be adapted for optical connection to optical fibers within the enclosure. For example, the interior ends 316 can be spliced to optical fibers within the enclosure. Alternatively, the interior ends 316 can be connectorized by a multi-fiber connector having a multi-fiber ferrule (e.g., an MPO connector) and can be coupled to other connectorized optical fibers within the enclosure by means such as a fiber optic adapter. When the exterior hardened connector is not installed within the hardened port 310, the hardened port 310 can be closed by a plug or cap having an interface that engages with the twist-to-lock interface 308. In other examples, the multi-fiber demateable fiber optic connection interface can include a fiber optic adapter including an inner port for receiving a non-hardened multi-fiber fiber optic connector (e.g., an MPO connector) and an outer port for receiving a hardened multi-fiber fiber optic connector.

It will be appreciated that the exterior hardened optical connector configured for insertion within the hardened port 310 also can include a multi-fiber ferrule in which a plurality of optical fibers is terminated. When the exterior hardened fiber optic connector is mated with the port 210, an optical connection is made between the optical fibers terminated in the ferrule of the hardened connector and the optical fibers 314 terminated at the ferrule 312 within the hardened port 310.

Figure 9:
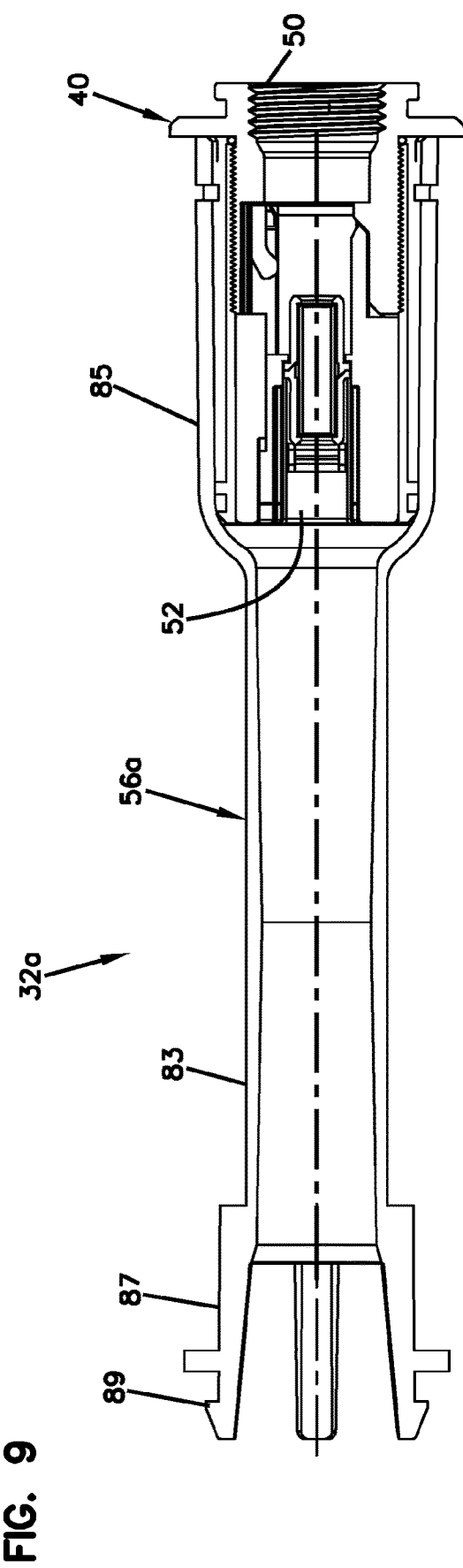
FIG. 9 shows another module sleeve in accordance with the principles of the present disclosure.
Figure 10:
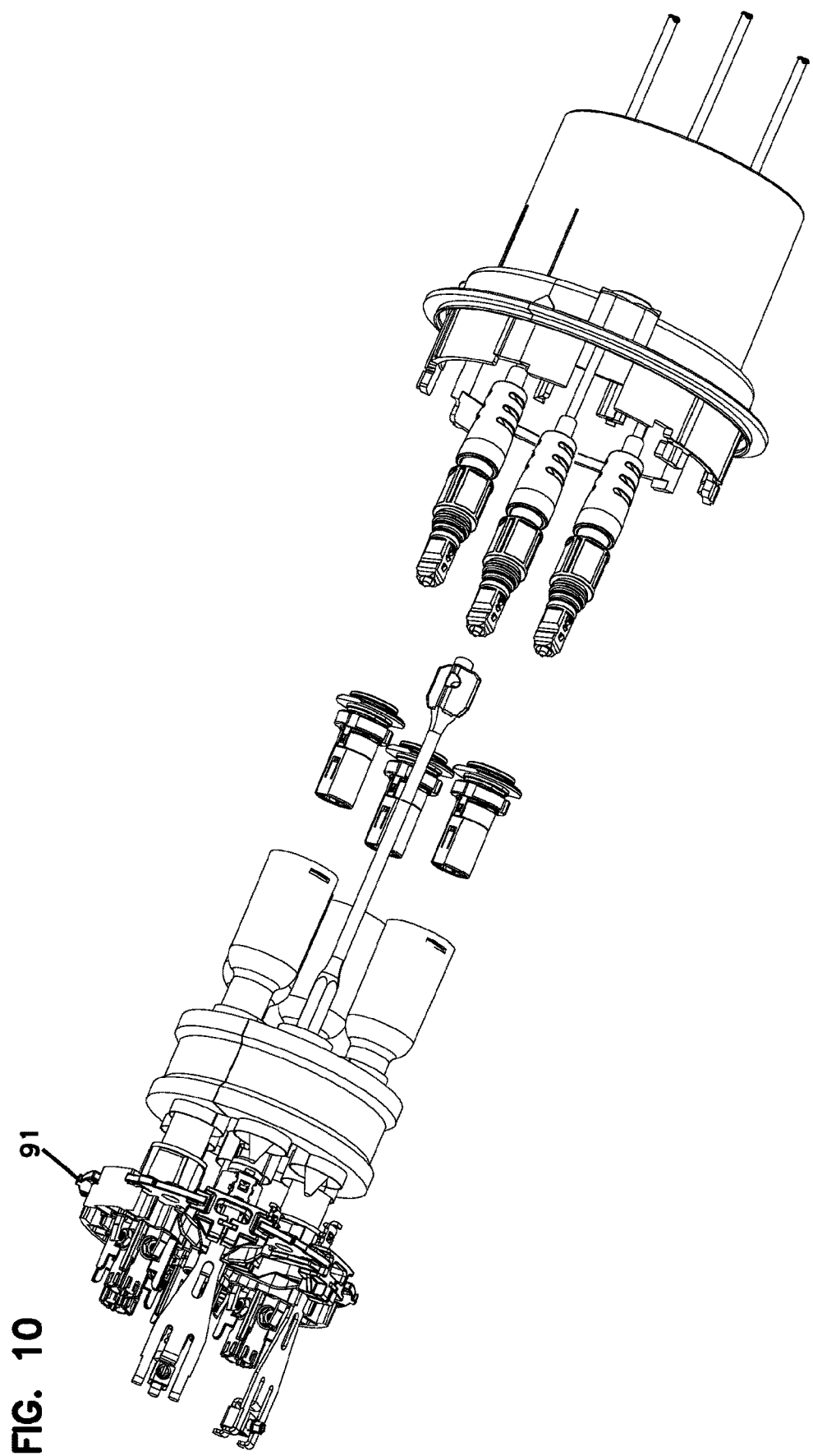
FIG. 10 illustrates a system in accordance with the principles of the present disclosure using one or more module sleeves of the type shown at FIG. 9 with the module sleeves attached to a fixture that mounts within an enclosure of the system.

FIG. 9 depicts another example connector module 32a including another example main body 56a forming a sleeve that can be received and sealed within one of the ports 28. The main body 56a has a relatively long configuration and includes a central portion 83 adapted to be received and sealed within one of the ports 28. The main body 56a also includes an outer end portion 85 having an enlarged cross-dimension as compared to the central portion 83 so as to define an enlarged cavity or pocket for receiving the fiber optic adapter 40. The main body 56a also includes an inner end portion 87 including an anchoring feature 89 (e.g., a latching arrangement, fingers, tabs, fasteners, clips, etc.) adapted to interlock with a fixture 91 (see FIG. 10) mounted within the enclosure 10. The second fiber optic connector 46 can be inserted into and removed from the port 52 of the adapter 40 via an extension tool. Alternatively, the second cable 48 can be inserted through the main body 56a and the second fiber optic connector 46 can be loaded into the port 52 prior to mounting the fiber optic adapter 40 within the outer end portion 85 of the main body 56a.

Figure 11:
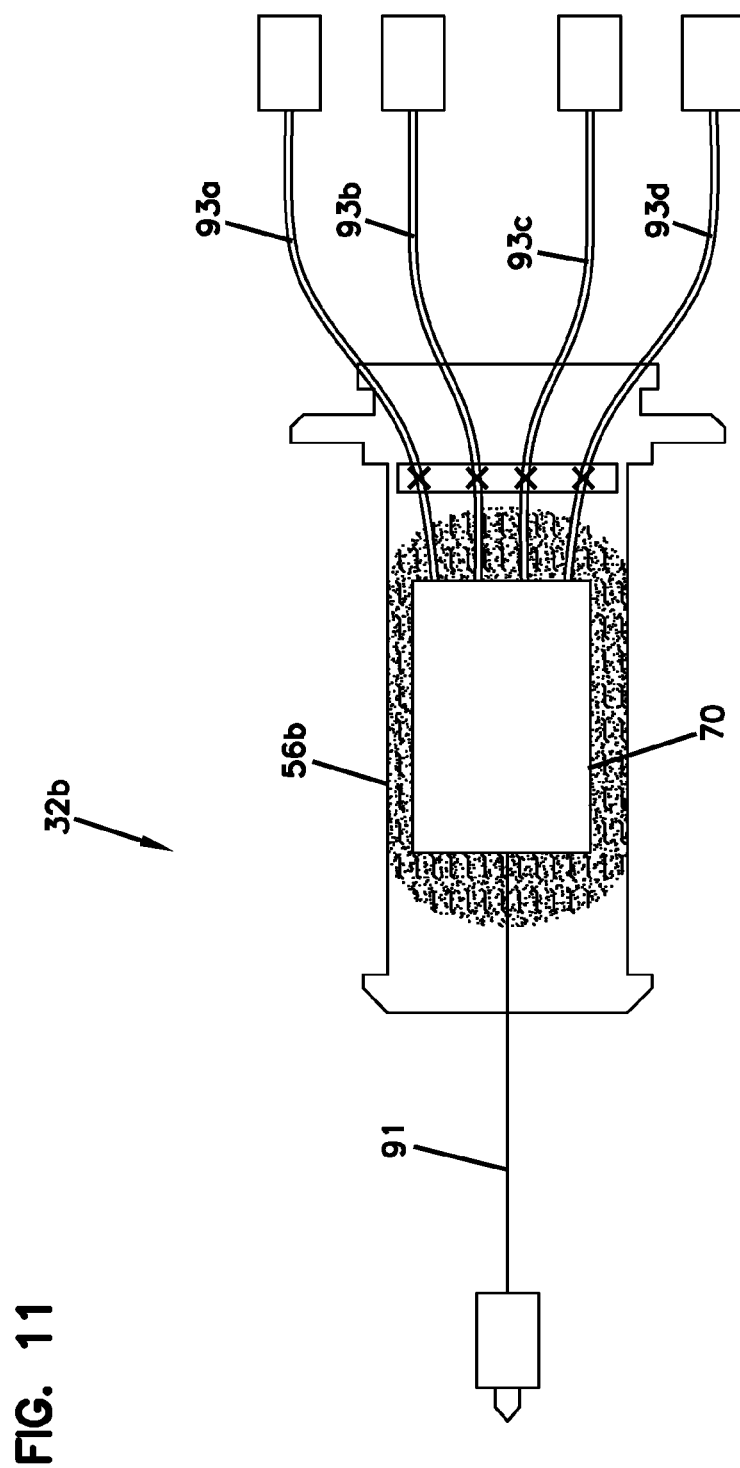
FIG. 11 is a schematic cross-sectional view of value-added fiber optic connection module in accordance with the principles of the present disclosure that includes an internal value-added component (e.g., a passive optical power splitter; a wavelength division multiplexer, a signal tap, etc.)

Referring to FIG. 11, another example connector module 32b is depicted in accord with the principles of the present disclosure. Similar to the connector modules 32, 32a described previously, the connector module 32b can be inserted within a cable through-port 28 of the sealant assembly 54 to be sealed with a gel type seal. The connector module 32b can include a main body 56b having a sleeve-like configuration with an outer surface adapted to be sealed within one of the ports 28. The main body 56b can have anchoring structures of the type described above for anchoring the connector module 32b relative to the enclosure 10. An optical component 70 can be positioned (e.g., mounted) within the main body 56b. In one example, the optical component 70 is sealed within the main body 56b by a sealant or other material. In one example, the optical component 70 includes one or more inputs and includes a plurality of outputs. In one example, the optical component 70 includes more outputs than inputs. In one example, the outputs include pigtails having connectorized ends. The connectorized ends can include hardened or non-hardened connectors and can include ferruled or non-ferruled connectors. In one example, the optical component is a passive optical power splitter (e.g., the connector module 32b is an optical power splitter module) or a wavelength division multiplexer (e.g. the connector module 32b is a wavelength division multiplexer module). In the case of a passive optical power splitter, the splitter can have a symmetric split ratio. Example split ratios includes 1×2; 1×4; 1×8; 1×16; 1×32; 2×4; 2×8; 2×16; 2×32 or other split ratios. The passive optical splitter can also be configured as a signal tap having an asymmetrical split ratio. For example, the passive optical splitter can have a 1×2 split configuration with one of the outputs having a significantly higher power level than the other output.

Figure 12:
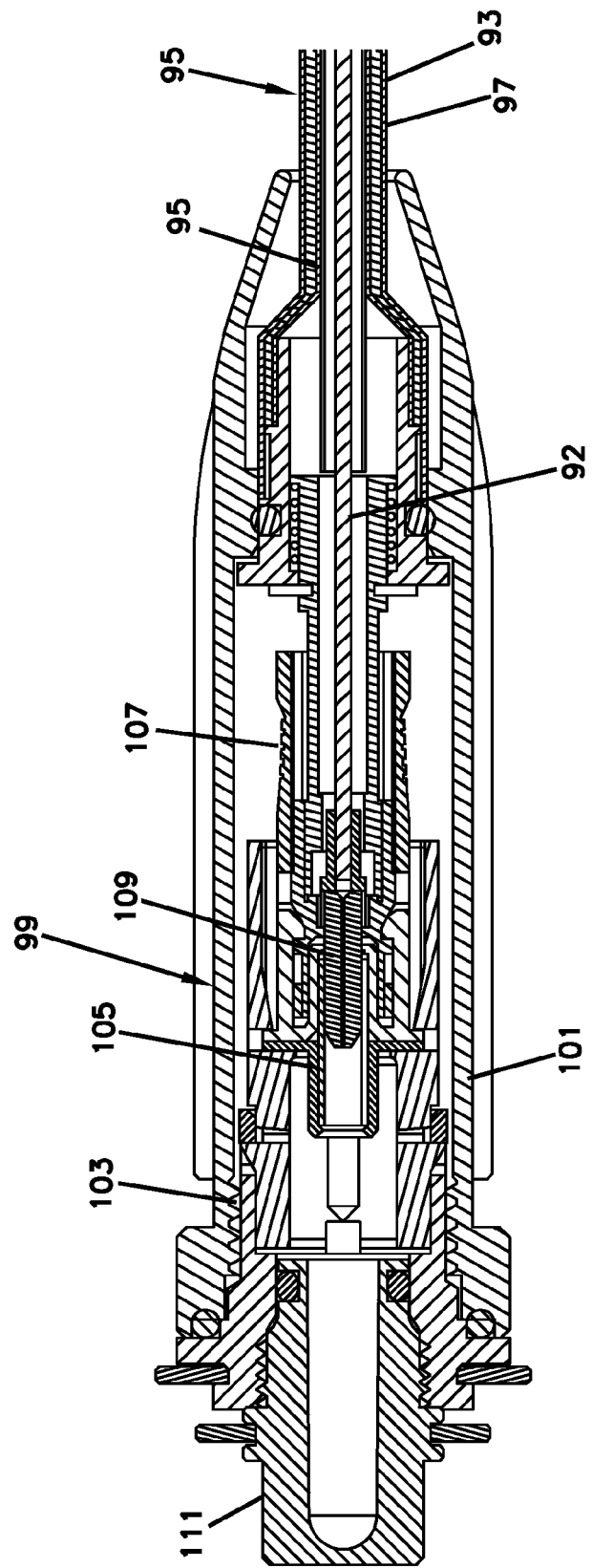
FIG. 12 shows an example hardened female fiber optic connector mounted at a free end of a tether of a module such as the module of FIG. 11.

As shown at FIG. 11, the example connector module 32b includes an input optical fiber 91 routed to the optical component 70, and a plurality of output optical fibers 93a-93d. The input optical fiber 91 can be coupled to an optical fiber of a distribution cable within the enclosure. The input optical fiber 91 can be connectorized (e.g., with an SC, LC or other type of fiber optic connector) or not connectorized. When connectorized, the input optical fiber can be optically connected to a connectorized optical fiber of a distribution cable by a fiber optic adapter within the enclosure. When non-connectorized, the input optical fiber can be optically spliced to an optical fiber of a distribution cable within the enclosure. The output optical fibers 93a-93d can be incorporated within optical pigtails that can be connectorized within hardened or non-hardened fiber optic connectors. The optical pigtails can include fiber optic cables having outer jackets and including strength components such as tensile strength members (e.g., string or yarn type strength components which can include aramid yarn or more rigid strength components such as fiber-glass reinforced polymer rods). The pigtails can be anchored relative to the main body 56b. One example pigtail is depicted at FIG. 12. The pigtail includes an optical fiber 92 incorporated in a pigtail cable 93 having a strength component 95 (e.g., aramid yarn) and an outer jacket 97. The pigtail cable 93 includes a free end and a base end. A hardened female fiber optic connector 99 is mounted at the free end. The base end of the pigtail cable 93 can be anchored to the main body 56b by securing the strength component 95 thereto or by otherwise clamping or affixing the cable 93 thereto. The hardened female fiber optic connector 99 includes an environmentally sealed shell 101 to which the strength component 95 of the pigtail cable 93 is secured. The shell defines a hardened connector port 103 for receiving a hardened male fiber optic connector. The hardened connector port 103 can include a twist-to-lock interface (e.g., threads, a bayonet-style interface, etc.) for coupling with the hardened male fiber optic connector. A removable dust plug 111 is shown temporarily secured within the hardened connector port 103. The hardened connector port 103 includes a ferrule alignment sleeve 105 mounted within the shell 101. The optical fiber 92 is terminated by a fiber optic connector 107 (e.g., a non-hardened fiber optic connector) that is housed within the shell 101. A ferrule 109 of the fiber optic connector 107 is received within the ferrule alignment sleeve 105. Further details of the hardened female fiber optic connector are disclosed by U.S. patent application Ser. No. 14/782,934, which is hereby incorporated by reference in its entirety.

Figure 13:
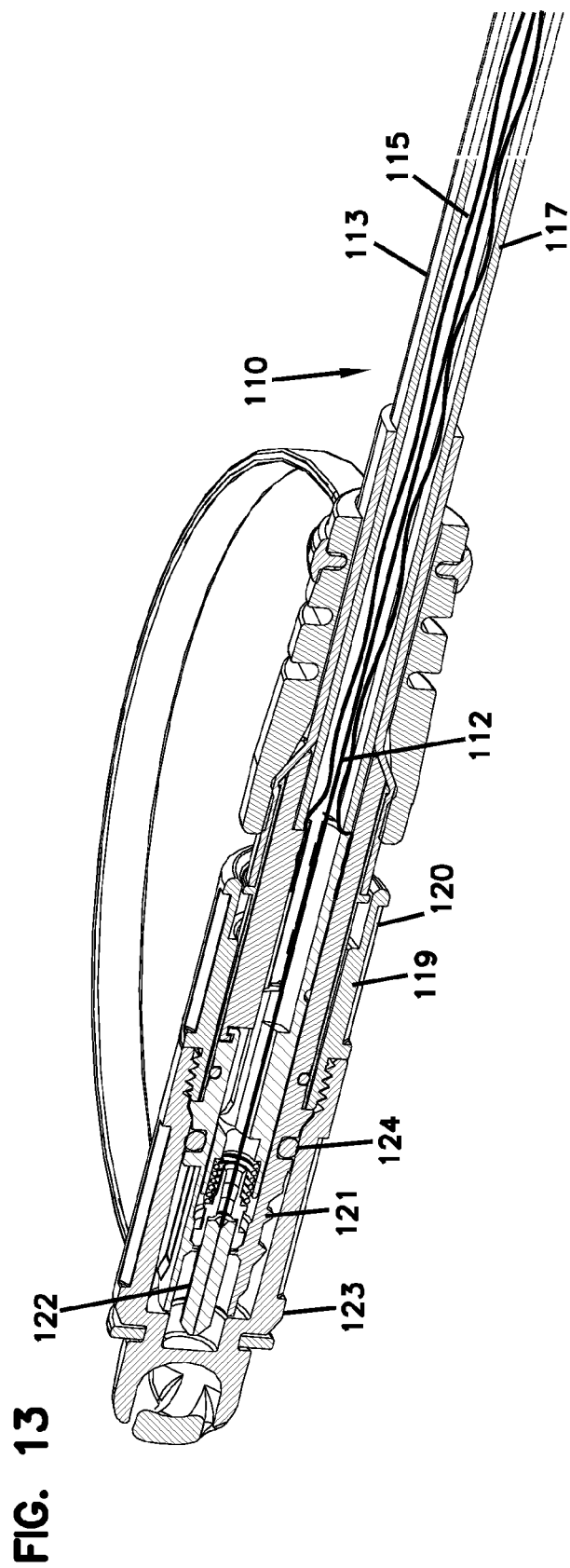
FIG. 13 shows an example hardened male fiber optic connector mounted at a free end of a tether of a module such as the module of FIG. 11.

Another example pigtail 110 is depicted at FIG. 13. The pigtail 110 includes an optical fiber 112 incorporated in a pigtail cable 113 having a strength component 115 (e.g., aramid yarn) and an outer jacket 117. The pigtail cable 113 includes a free end and a base end. A hardened male fiber optic connector 119 is mounted at the free end. The base end of the pigtail cable 113 can be anchored to the main body 56b by securing the strength component 115 thereto or by otherwise clamping or affixing the cable 113 thereto. The hardened male fiber optic connector 119 includes a plug body 121 to which the strength component 115 of the pigtail cable 113 is secured. The plug body 121 supports a ferrule 122 that receives an end of the optical fiber 112. A seal 124 can be mounted on the plug body 121. The hardened male fiber optic connector 119 can include a twist-to-lock interface (e.g., threaded coupler 120, a coupler with a bayonet-style interface, etc.) mounted on the plug body 121 for coupling with a hardened female fiber optic connector. A removable dust cap 123 is shown temporarily secured over the plug body 121 to protect the ferrule 122 and the optical fiber 112. Further details of the hardened male fiber optic connector are disclosed by U.S. patent application Ser. No. 14/896,394, which is hereby incorporated by reference in its entirety.

Figure 14:
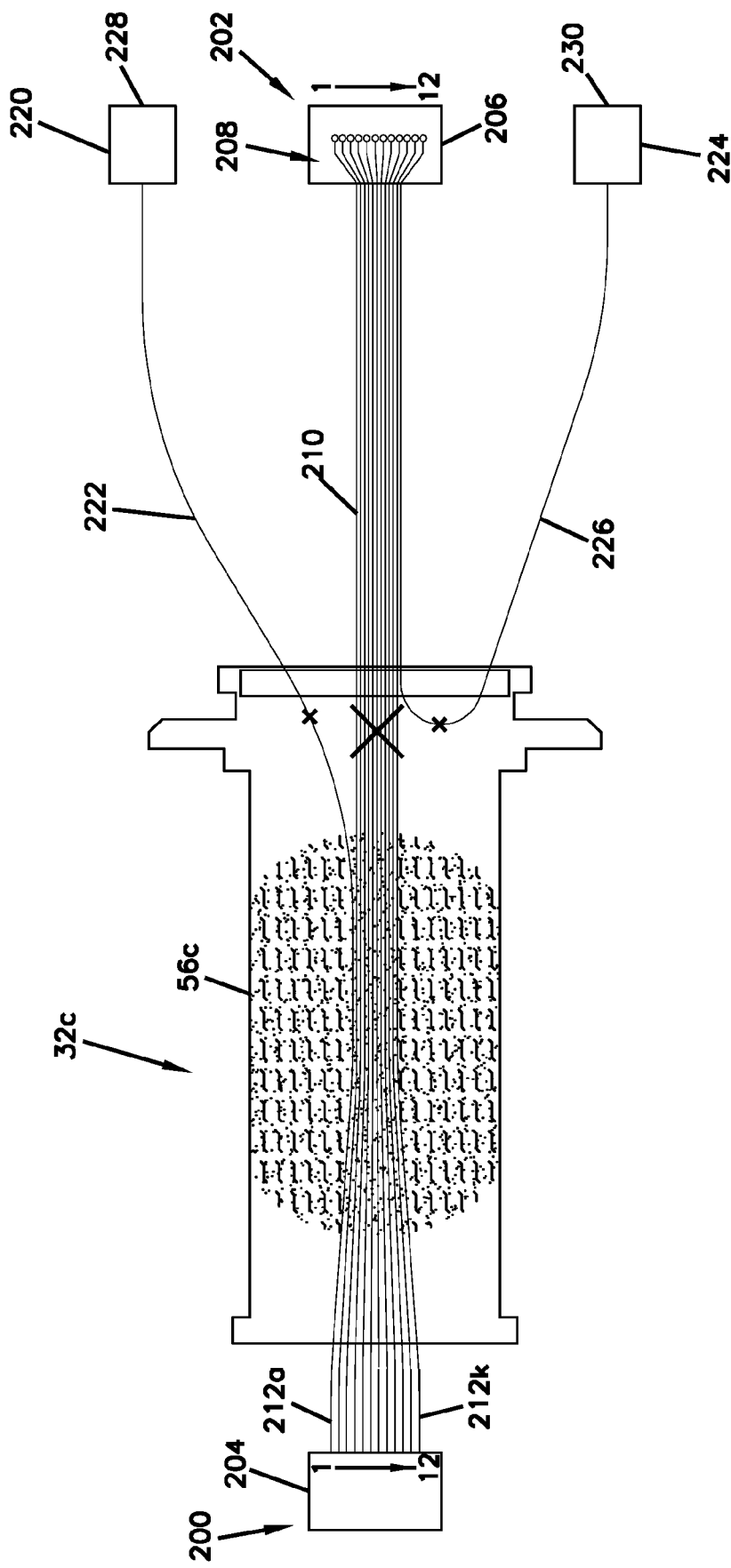
FIG. 14 is a schematic cross-sectional view of a fiber optic connection module in accordance with the principle of the present disclosure having indexing functionality.

Referring to FIG. 14, another example connector module 32c is depicted in accord with the principles of the present disclosure. Similar to the connector modules 32, 32a and 32b described previously, the connector module 32c can be inserted within a cable through-port 28 of the sealant assembly 54 to be sealed with a gel type seal. The connector module 32c can include a main body 56c having a sleeve-like configuration with an outer surface adapted to be sealed within one of the ports 28. The main body 56c can have anchoring structures of the type described above for anchoring the connector module 32c relative to the enclosure 10. Optical fibers (e.g., fiber optic cables each including one or more optical fibers) can be routed through the main body 56c. In one example, the optical fibers are sealed within the main body 56c by a sealant or other material. In one example, the connector module 32c provides indexing functionality. In certain examples, indexing functionality includes indexing optical fibers between sequential fiber positions of a first demateable fiber optic connection location and sequential fiber positions of a second demateable fiber optic connection location. In certain examples, the sequential fiber positions can be arranged sequentially in a row. In certain examples, the sequential fiber positions can be arranged in an array. In certain examples, the sequential fiber positions can be defined by a multi-fiber ferrule. In certain examples, the multi-fiber ferrule can include an MPO ferrule. In certain examples, each demateable fiber optic connection location can include 4, 6, 8, 12, 18, 24 or more fiber positions. In certain examples, one, two, three, four or more fiber positions of the first demateable fiber optic connection location are optically coupled to a drop location or drop locations which can be demateable fiber optic drop connection locations. In certain examples, the fiber optic drop connection locations can include single fiber or multi-fiber connection locations. In certain examples, one, two, three, four or more fiber positions of the first and second demateable fiber optic connection location are each optically coupled to a drop location or drop locations which can be demateable fiber optic drop connection locations. In the case where multiple drops are made from a given one of the demateable fiber optic connection locations, the drops can be coupled to individual single-fiber optical connectors or to a multi-fiber optical connector. The fiber optic connectors can be hardened or non-hardened and can be ferruled or non-ferruled.

Figure 15:
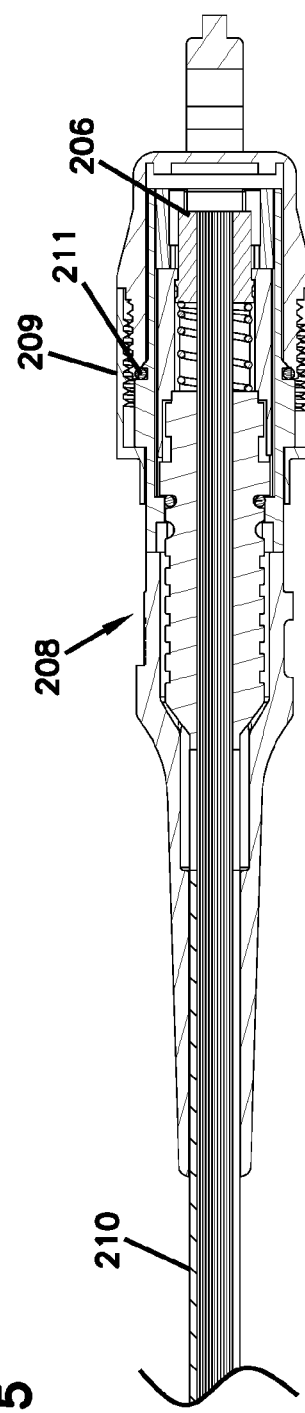
FIG. 15 shows an example hardened multi-fiber fiber optic connector mounted at a free end of a tether of a module such as the module of FIG. 14.

As depicted at FIG. 14, the indexing module 32c includes first and second de-mateable multi-fiber connection interfaces 200, 202 each having sequential fiber positions. In one example, the sequential fiber positions are arranged in one or more rows. In one example, the sequential fiber positions are defined by multi-fiber ferrules 204, 206 (e.g., MPO ferrules). In one example, the first demateable multi-fiber connection interface 200 includes an MPO connector and the second demateable multi-fiber connection interface 202 includes a hardened multi-fiber connector 208 (see FIG. 15). The hardened multi-fiber connector 208 can be mounted at the end of a pigtail cable 210 (i.e., a tether cable) having a base end anchored to the main body 56c (e.g., strength members of the pigtail cable can be fixed relative to the main body 56c or the entire pigtail cable can be clamped or otherwise fixed relative to the main body 56c). The hardened multi-fiber connector 208 can include a twist-to-lock coupler (e.g., an internally threaded sleeve 209) adapted to interlock with a mating hardened multi-fiber connector. The hardened multi-fiber connector 208 can also include one or more seals 211. A removable dust cap 213 is shown coupled to the internally threaded sleeve 209.

In the depicted example, the sequential fiber positions of the first and second de-mateable fiber optic connection locations 200, 202, each include 12 positions arranged in a single row defined by a multi-fiber ferrule. The indexing module 32c also includes a plurality of indexing optical fibers 212 routed between the first and second de-mateable multi-fiber connection locations 200, 202. The plurality of indexing optical fibers 212 are indexed such that the first ends of the plurality of indexing optical fibers 212 at the first de-mateable multi-fiber connection interface 200 are at different ones of the sequential fiber positions as compared to second ends of the plurality of indexing optical fibers 212 at the second de-mateable multi-fiber connection location 202. As depicted, the plurality of indexing optical fibers 212 are routed through the main body 56c and the pigtail cable 210 and are indexed one position from the first de-mateable multi-fiber connection location 200 to the second de-mateable multi-fiber connection location 202. It will be appreciated that other indexing patterns or schemes could also be used. As depicted, eleven indexing fibers 212a-212k are respectively indexed from positions 2-12 of the first de-mateable multi-fiber connection location 200 to positions 1-11 of the second de-mateable multi-fiber connection location 202.

In certain examples, indexing modules in accordance with the principles of the present disclosure can include a drop de-mateable fiber optic connection location coupled to at least one of the sequential fiber positions of at least one of the first and second de-mateable multi-fiber connection locations. In some examples, drop de-mateable fiber optic connection locations are coupled to at least one of the sequential fiber positions of each of the first and second de-mateable multi-fiber connection locations. In some examples, indexing modules in accordance with the principles of the present disclosure can include a drop de-mateable fiber optic connection location coupled to a plurality of the sequential fiber positions of at least one of the first and second de-mateable multi-fiber connection locations; the drop de-mateable fiber optic connection location can include a plurality of single-fiber fiber optic connectors or at least one multi-fiber fiber optic connector.

As shown at FIG. 14, the indexing module 32c includes a first drop de-mateable fiber optic connection location 220 optically coupled to the 1st fiber position of the first demateable multi-fiber connection location 200 by drop fiber 222 and a second drop de-mateable fiber optic connection location 224 coupled to the $12^{th}$ fiber position of the second demateable multi-fiber connection location 202 by drop fiber 226. The first and second drop de-mateable fiber optic connection locations 220, 224 can include fiber optic connectors 228, 230 such as hardened fiber optic connectors (e.g., see female hardened connector 99 or male hardened connector 119). The fiber optic connectors 228, 230 can be mounted at the end of pigtail cables (e.g., see pigtail cable 95 or pigtail cable 110) that are anchored to the main body 56c. The drop fiber 222 can be routed though the main body 56c and the pigtail cable corresponding to the first drop de-mateable fiber optic connection location 220. The drop fiber 226 can be routed through the pigtail cable 210, can loop through the main body 32c and can then be routed through the pigtail cable corresponding to the second drop de-mateable fiber optic connection location 224.

With the module 32c installed in the gel block of the enclosure 10, the first de-mateable multi-fiber connection location 200 can be coupled to optical fibers of a distribution cable routed into or passed through the enclosure 10. The second de-mateable multi-fiber connection location 202 can be coupled to a daisy chain of indexing devices routed from the enclosure. Example chains of indexing terminal are disclosed in U.S. Pat. No. 9,348,096, which is hereby incorporated by reference in its entirety.

Figure 16:
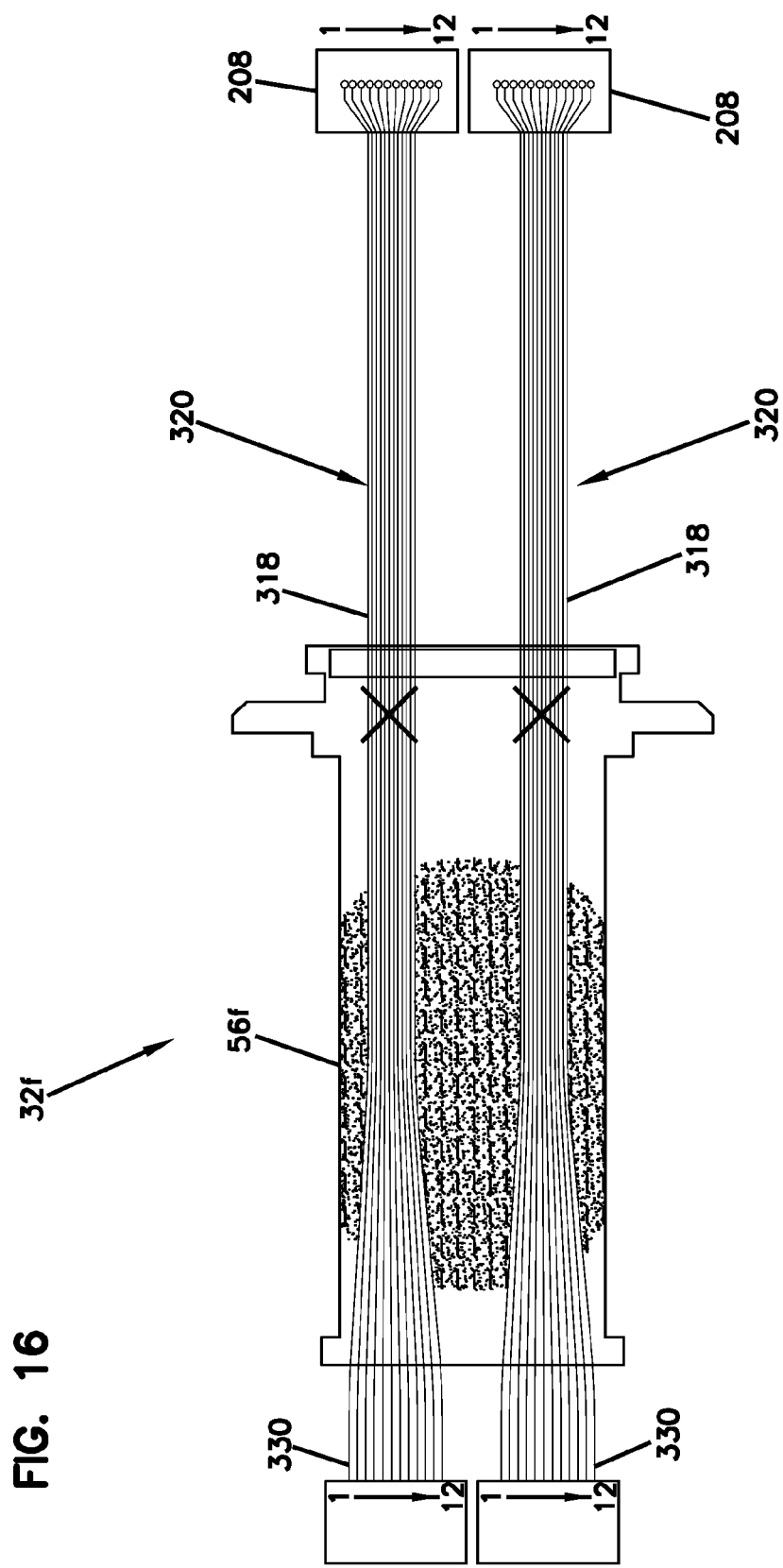
FIG. 16 shows another fiber optic connection module in accordance with the principles of the present disclosure.

Referring to FIG. 16, another example connector module 32f is depicted in accord with the principles of the present disclosure. Similar to the connector modules 32, 32a, 32b and 32c described previously, the connector module 32f can be inserted within a cable through-port 28 of the sealant assembly 54 to be sealed with a gel type seal. The connector module 32f can include a main body 56f having a sleeve-like configuration with an outer surface adapted to be sealed within one of the ports 28. The main body 56f can have anchoring structures of the type described above for anchoring the connector module 32f relative to the enclosure 10. Optical fibers 318 (e.g., fiber optic cables each including one or more optical fibers) can be routed through the main body 56f. In one example, the optical fibers 318 are sealed within the main body 56f by a sealant or other material and can be protected with one or more protective conduits (e.g., buffer tubes, furcation tubes, sleeves, jackets, etc.). In one example, the connector module 32f includes one or more fiber optic pigtails 320 that extend outwardly from the main body 56f. The optical fibers 318 can extend through the one or more fiber optic pigtails 320. The fiber optic pigtails 320 can include base ends anchored to the main body 56f (e.g., strength members of the pigtails such as Aramid yarns or rods can be anchored to the main body 56f). Hardened multi-fiber connectors 208 can be mounted at the outer ends of the one or more pigtails 320. The hardened multi-fiber connectors 208 can include a twist-to-lock couplers (e.g., internally threaded sleeves 209) adapted to interlock with a mating hardened multi-fiber connector. The hardened multi-fiber connectors 208 can also include one or more seals 211. The optical fibers 318 can be ribbonized and when the module is mounted in one of the sealed ports of the enclosure, the optical fibers 318 can extend from the main body 56f into the interior of the enclosure. Interior ends 330 of the optical fibers 318 can be adapted for optical connection to optical fibers within the enclosure. For example, the interior ends 330 can be spliced to optical fibers within the enclosure. Alternatively, the interior ends 330 can be connectorized by one or more multi-fiber connectors each having a multi-fiber ferrule (e.g., an MPO connector) and can be coupled to other connectorized optical fibers within the enclosure by means such as fiber optic adapters.

In some examples, connectorized fiber optic pigtails of the type described herein are relatively short in length. For example, the pigtails can be less than or equal to 5 feet in length or less than or equal to 3 feet in length. Of course, in other examples, longer pigtails can be used.

It will be appreciated that various materials can be used to form the volume of sealant of the sealant arrangement. In some examples, the volume of sealant can include a gel. The gel may also be combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The gel can also include additives such as moisture scavengers, antioxidants, tackifiers, pigments and/or fungicides. In certain embodiments, the gel in accordance with the principles of the present disclosure has ultimate elongations greater than 100 percent with substantially elastic deformation to an elongation of at least 100 percent. In other embodiments, the gel in accordance with the principles of the present disclosure has ultimate elongations of at least 200 percent, or at least 500 percent, or at least 1000 percent. Ultimate elongation can be determined by the testing protocol set forth at ASTM D412. In one example, the sealant has a shore hardness between about 24 and about 35 shore 000 hardness.

From the foregoing detailed description, it will be evident that modifications and variations can be made in the devices of the disclosure without departing from the spirit or scope of the invention.

What is claimed is:

1. An enclosure comprising:
    a housing;
    a volume of sealant that defines a port in communication with an interior of the housing;
    a fiber optic indexing module including a main body that mounts within the port with the volume of sealant forming a seal around an exterior of the main body, the indexing module including first and second de-mateable multi-fiber connection interfaces each having sequential fiber positions; and
    a plurality of indexing optical fibers and a pigtail cable, wherein the plurality of indexing optical fibers is routed between the first and second de-mateable multi-fiber connection locations and through the main body and the pigtail cable;
    wherein the first de-mateable multi-fiber connection interface includes an MPO connector and the second de-mateable multi-fiber connection interface includes a hardened multi-fiber connector; and
    wherein the hardened multi-fiber connector is mounted at an end of the pigtail cable having a base end anchored to the main body.

2. The enclosure of claim 1, wherein the plurality of optical fibers is sealed within the main body by a sealant.

3. The enclosure of claim 1, wherein the sequential fiber positions are arranged sequentially in a row.

4. The enclosure of claim 1, wherein the sequential fiber positions are arranged in an array.

5. The enclosure of claim 1, wherein the sequential fiber positions are defined by a multi-fiber ferrule.

6. The enclosure of claim 1, wherein the plurality of indexing optical fibers are indexed such that first ends of the plurality of indexing optical fibers at the first de-mateable multi-fiber connection interface are at different ones of the sequential fiber positions as compared to second ends of the plurality of indexing optical fibers at the second de-mateable multi-fiber connection interface.

7. An enclosure comprising:
a housing;
a volume of sealant that defines a port in communication with an interior of the housing;
a fiber optic indexing module including a main body that mounts within the port with the volume of sealant forming a seal about an exterior of the main body, the indexing module including first and second de-mateable multi-fiber connection interfaces each having sequential fiber positions; and
a plurality of indexing optical fibers and a pigtail cable, wherein the plurality of indexing optical fibers is routed between the first and second de-mateable multi-fiber connection locations and through the main body and the pigtail cable
wherein the fiber optic indexing module includes a first drop de-mateable fiber optic connection location optically coupled to a first fiber position of the first de-mateable multi-fiber connection interface by a first drop fiber and a second drop de-mateable fiber optic connection location optically coupled to a twelfth fiber position of the second de-mateable multi-fiber connection interface by a second drop fiber;
wherein the second de-mateable multi-fiber connection interface and the first drop de-mateable connection location are provided at free ends of tethers that extend from the main body.

8. The enclosure of claim 7, wherein the first and second drop de-mateable fiber optic connection locations include fiber optic connectors.

9. The enclosure of claim 7, wherein the first drop de-mateable connection location couples to a plurality of first drop fibers coupled to sequential fiber positions of the first de-mateable multi-fiber connection interface.

10. An enclosure comprising:
a housing;
a volume of sealant that defines a port in communication with an interior of the housing;
a fiber optic indexing module including a main body that mounts within the port with the volume of sealant forming a seal about an exterior of the main body, the indexing module including first and second de-mateable multi-fiber connection interfaces each having sequential fiber positions; and
a plurality of indexing optical fibers and a pigtail cable, wherein the plurality of indexing optical fibers is routed between the first and second de-mateable multi-fiber connection locations and through the main body and the pigtail cable;
wherein the fiber optic connectors are mounted at an end of the pigtail cable anchored to the main body.

11. An enclosure comprising:
a housing;
a volume of sealant that defines a port in communication with an interior of the housing;
a fiber optic indexing module including a main body that mounts within the port with the volume of sealant forming a seal around an exterior of the main body, the indexing module including first and second de-mateable multi-fiber connection interfaces each having sequential fiber positions; and
a plurality of indexing optical fibers and a pigtail cable, wherein the plurality of indexing optical fibers is routed between the first and second de-mateable multi-fiber connection locations and through the main body and the pigtail cable;
wherein the first de-mateable multi-fiber connection interface includes an MPO connector and the second de-mateable multi-fiber connection interface includes a hardened multi-fiber connector; and
wherein the hardened multi-fiber connector includes a an internally threaded sleeve adapted to interlock with a mating hardened multi-fiber connector.

12. The enclosure of claim 11, wherein the hardened multi-fiber connector includes one or more seals.

13. The enclosure of claim 11, further comprising a removable dust cap coupled to the internally threaded sleeve.

14. An enclosure comprising:
a housing;
a volume of sealant that defines a port in communication with an interior of the housing;
a fiber optic indexing module including a main body that mounts within the port with the volume of sealant forming a seal about an exterior of the main body, the indexing module including first and second de-mateable multi-fiber connection interfaces each having sequential fiber positions;
a plurality of optical fibers routed through the main body; and
fiber optic pigtails extending outwardly from the main body and including base ends anchored to the main body, wherein the plurality of optical fibers extend through the fiber optic pigtails and hardened multi-fiber connectors are mounted at outer ends of the fiber optic pigtails.

15. The enclosure of claim 14, wherein the plurality of optical fibers are ribbonized.

* * * * *